United States Patent
Li et al.

(10) Patent No.: US 10,044,421 B2
(45) Date of Patent: Aug. 7, 2018

(54) WIRELESS COMMUNICATION VIA COMBINED CHANNEL TRAINING AND PHYSICAL LAYER HEADER SIGNALING

(71) Applicants: Qinghua Li, San Ramon, CA (US); Xiaogang Chen, Beijing (CN); Huaning Niu, Milpitas, CA (US); Yuan Zhu, Beijing (CN)

(72) Inventors: Qinghua Li, San Ramon, CA (US); Xiaogang Chen, Beijing (CN); Huaning Niu, Milpitas, CA (US); Yuan Zhu, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 190 days.

(21) Appl. No.: 14/583,253

(22) Filed: Dec. 26, 2014

(65) Prior Publication Data

US 2016/0066324 A1    Mar. 3, 2016

Related U.S. Application Data

(60) Provisional application No. 62/042,116, filed on Aug. 26, 2014.

(51) Int. Cl.
*H04B 7/04* (2017.01)
*H04B 7/0452* (2017.01)
(Continued)

(52) U.S. Cl.
CPC ......... *H04B 7/0452* (2013.01); *H04B 7/0617* (2013.01); *H04L 5/0023* (2013.01);
(Continued)

(58) Field of Classification Search
CPC ... H04B 7/0452; H04B 7/0617; H04L 5/0023; H04L 5/0048; H04L 5/0091; H04L 69/22
See application file for complete search history.

(56) References Cited

U.S. PATENT DOCUMENTS

| | | | |
|---|---|---|---|
| 6,654,408 B1 * | 11/2003 | Kadous | H04L 27/2647 375/148 |
| 2004/0264603 A1 * | 12/2004 | Krasny | H04L 25/0212 375/340 |

(Continued)

FOREIGN PATENT DOCUMENTS

| | | |
|---|---|---|
| TW | 201114208 | 4/2011 |
| WO | 2013130793 | 9/2013 |

OTHER PUBLICATIONS

International Search Report and Written Opinion for PCT Application No. PCT/US2015/037721 dated Oct. 7, 2015.

(Continued)

*Primary Examiner* — Curtis A Alia
(74) *Attorney, Agent, or Firm* — Eversheds Sutherland (US) LLP

(57) ABSTRACT

Embodiments herein relate to wireless communication using combined channel training and physical layer header (SIG) signaling. Devices that comply with the 802.11ax or High Efficiency WLAN (HEW) standard may generate and transmit packets that include such combined information. The combined information may be beamformed to a receiver device via an OFDM signal, which may be decoded by the receiver device to obtain subsequent data included in the signal. For example, initial training symbols associated with channel training subcarriers in the signal may be detected and used to perform a rough estimate of the channel. The rough estimate may thereafter be refined using data symbols detected from adjacent data subcarriers using the channel training symbols. In this way, data subcarriers may also be used to determine a channel response along with channel training subcarriers. Channel training information may be transmitted with data, such as user-specific information, in a single symbol.

33 Claims, 7 Drawing Sheets

(51) Int. Cl.
 *H04L 29/06* (2006.01)
 *H04B 7/06* (2006.01)
 *H04L 5/00* (2006.01)

(52) U.S. Cl.
 CPC .......... *H04L 5/0048* (2013.01); *H04L 5/0091* (2013.01); *H04L 69/22* (2013.01)

(56) References Cited

U.S. PATENT DOCUMENTS

| | | | |
|---|---|---|---|
| 2009/0225891 A1* | 9/2009 | Ma | H04B 7/04 375/267 |
| 2011/0051705 A1* | 3/2011 | Jones, IV | H04L 27/2613 370/338 |
| 2013/0229996 A1 | 9/2013 | Wang et al. | |
| 2014/0078966 A1 | 3/2014 | Erceg et al. | |
| 2014/0079048 A1 | 3/2014 | Van Nee et al. | |
| 2014/0140312 A1 | 5/2014 | Lee et al. | |
| 2014/0211775 A1 | 7/2014 | Sampath et al. | |

OTHER PUBLICATIONS

Office Action and Search Report from Taiwanese Application No. 104123706 dated Jul. 25, 2016. (9 pgs., including 1 pg. English translation of Search Report).

\* cited by examiner

WIRELESS COMMUNICATION VIA COMBINED CHANNEL TRAINING AND PHYSICAL LAYER HEADER SIGNALING

RELATED APPLICATIONS

The present application is a non-provisional patent application claiming priority to U.S. Provisional Application No. 62/042,116, entitled "Combining Physical Layer Header and Channel Training Symbols for Communication with High Efficiency WLAN (HEW) Devices," filed Aug. 26, 2014, and is hereby incorporated by reference in its entirety as if fully set forth herein.

BACKGROUND

More recent wireless standards include modifications to the symbol duration of wireless transmissions. These modifications may result in increases in channel training overhead, and therefore, may reduce efficiency of wireless communications. The modifications may also be directed to a relatively large physical layer header (SIG), the transmission of which may be vulnerable given the size of the SIG and reliance upon broadcast communication for the SIG. Further troublesome is the lack of spatial multiplexing of the SIG by existing systems. As the number of spatial streams and wireless users increases, therefore, so too does the vulnerability of wireless communications, among other deficiencies.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Figure 1:
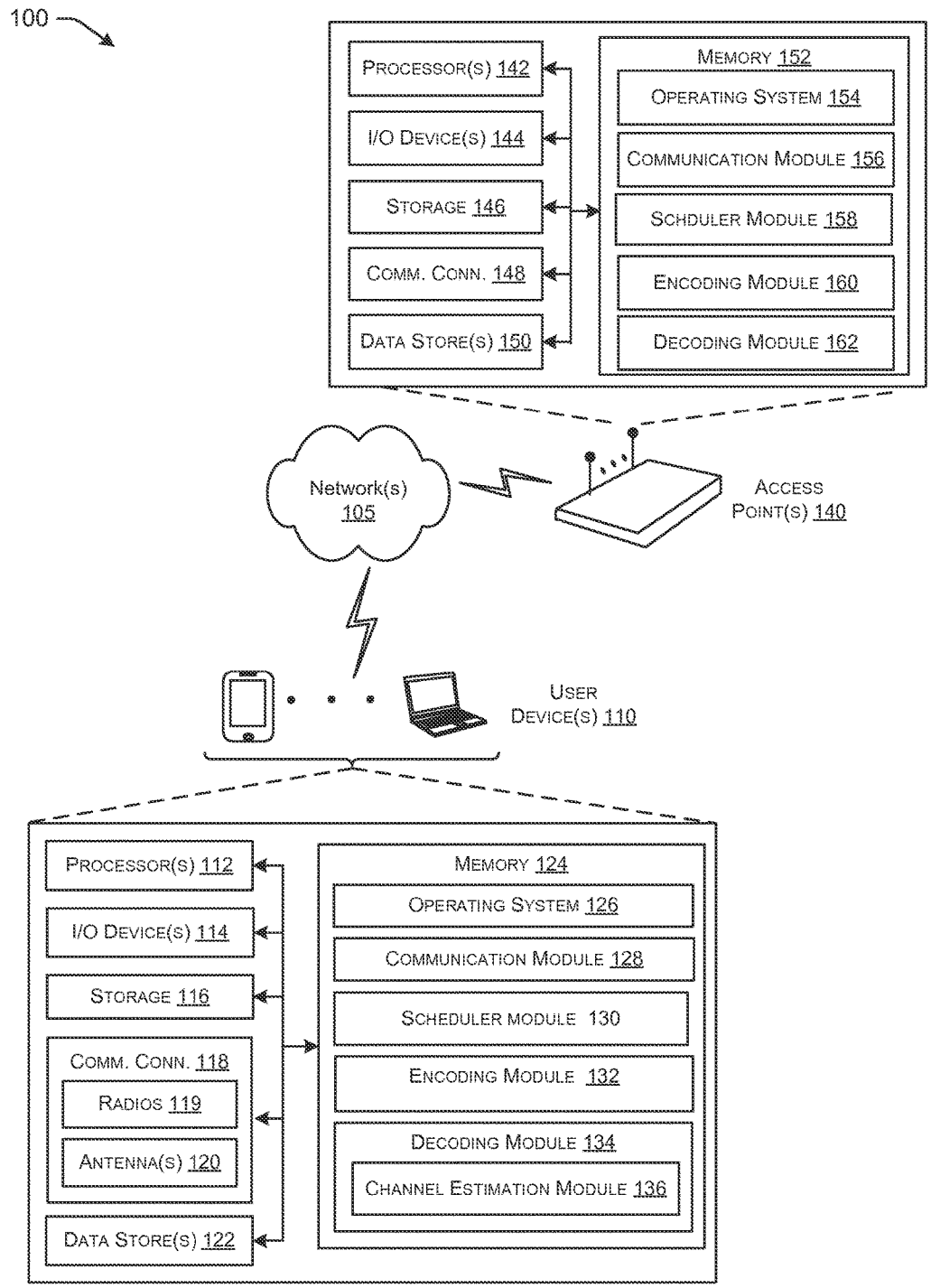
FIG. 1 illustrates an example computing environment for implementing wireless communication via combined channel training and physical layer header signaling, according to an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein relate to, among other things, wireless communication using combined channel training and physical layer header (SIG) signaling. Devices that comply with the 802.11ax or High Efficiency WLAN (HEW) standard may generate and transmit packets that include such combined information, along with other portions of the physical layer header (SIG) to facilitate the transmission. For example, a transmitting device may generate a first portion of the physical layer header (SIG) packet that includes common information that may be used by a receiver device to decode data designated for the receiver device. The transmitting device may also generate a second portion of the physical layer header (SIG), which may include channel training signals combined with physical layer header (SIG) bits that correspond to particular information for each user or device scheduled to receive a transmission over a wireless network. Information that may not fit within the second portion of the portion of the physical layer header (SIG) may be stored in an optional third portion of the physical layer header (SIG), in some examples.

The second and third portions of the physical layer header (SIG) may be beamformed to the receiver device via an Orthogonal Frequency Division Multiplexing (OFDM) or Orthogonal Frequency Division Multiple Access (OFDMA) signal in which subcarriers carrying the channel training symbols may be interleaved with subcarriers carrying the particular information for each device. The receiver device may decode the received OFDM or OFDMA signal in a manner that reduces channel training. For example, initial training symbols associated with the channel training subcarriers may be determined and used to perform a rough estimate of the channel. The initial training symbols may also be used to detect data symbols on adjacent data subcarriers interleaved with the channel training subcarriers. The detected data symbols may thereafter be used as training symbols for refining the rough channel estimate. In this way, data subcarriers may also be used to determine a channel response along with channel training subcarriers. Channel training information may therefore be transmitted with user or device-specific information in a single symbol, in certain embodiments herein. Prior systems may be directed to transmitting such training information in one symbol, while transmitting user or device-specific information in one or more additional symbols.

The above descriptions are for purposes of illustration and are not meant to be limiting. Numerous other configurations, examples, etc., may exist, some of which are described in greater detail below.

FIG. 1 depicts an example computing environment 100 for implementing wireless communication via combined channel training and physical layer header signaling, according to an embodiment of the disclosure. The example computing environment 100 may include, but is not limited to, one or more user devices 110 and access points 140. Each of these devices may be configured to communicate with one another over one or more networks 105. For example, an access point 140 may send information to a receiving user device 110. Such information may be included in a packet in which channel training bits and physical layer header (SIG) bits may be combined in the physical layer header of the packet. The access point 140 may generate such a packet, as will be described in greater detail below, in one embodiment.

As another example, a sending user device 110 may send information, which may also include combined channel training bits and physical layer header (SIG) bits encoded by the sending user device 110, to a receiving user device 110. The sending user device 110 may send the information directly to the receiving user device 110, for example, in embodiments in which the sending user device 110 serves as a group owner of a peer-to-peer group that includes the sending user device 110 and the receiving user device 110. In another embodiment, the sending user device 110 may send the information to the access point 140, which may forward the information to the receiving user device 110. Other examples of communicating information between the devices in FIG. 1 may exist. While a particular type of communication between various devices herein may be described, such descriptions are for purposes of illustration and are not meant to be limiting.

A user device 110 that receives the packet may decode or demodulate the packet using information in such a physical layer header of the packet. For example, the channel training bits may be used to train broadband and beamform communication channels between the sending device and the receiving device. The physical layer header bits may include information that enables the receiving device to decode the signals carrying the information and subsequently access the data in the signals. Such training and physical layer header information may be communicated during the same symbol duration and may effectively reduce the overhead of channel training, as will be described in greater detail below.

As used herein, the term "device" may refer to any computing component that includes one or more processors that can be configured to execute computer-readable, computer-implemented, or computer-executable instructions. Example devices may include a station (e.g., a wireless station), personal computers, docking systems, server computers, server farms, digital assistants, smart phones, personal digital assistants, digital tablets, smart cards, Internet appliances, application-specific circuits, microcontrollers, minicomputers, transceivers, kiosks, other host devices, client devices, mobile devices, or generally other processor-based devices. The execution of suitable computer-implemented instructions by one or more processors associated with various devices may form special purpose computers or other particular machines that may implement or facilitate the processes described herein.

As used herein, beamforming may refer to a signal processing technique used in sensor arrays for directional signal transmission or reception. The directional transmission and reception may be performed by combining elements in a phased array in such a way that signals at particular angles experience constructive interference while others experience destructive interference. Beamforming techniques may include estimating the relative direction where a radio signal originates, periodically re-evaluating interference, signal strengths, etc., and refining or improving the quality of a communication link based on such adaptive processes. Various techniques for calculating the direction of arrival, such as angle of arrival (AoA), time difference of arrival (TDOA), frequency difference of arrival (FDOA), a hybrid of the above techniques, or other similar detection techniques may be utilized to determine the relative direction of a transmission source. Such techniques may be utilized to project a directional transmission or to focus a receive antenna system. Beamforming may also be referred to as association beamforming training (ABFT) in some embodiments.

A wireless network herein, such as the one or more networks 105 that enable communication between the devices in FIG. 1, may utilize various frequencies to enable such communication. For example, the devices in FIG. 1 may communicate via 802.11ax as defined by the Institute of Electrical and Electronics Engineers (IEEE). IEEE 802.11ax is currently under development and may succeed 802.11ac. IEEE 802.11ax is directed to increasing the efficiency of WLAN networks, providing at least four (4) times the throughput of 802.11ac, and enabling multiple simultaneous communications in both spatial and frequency domains in both the uplink and downlink direction, among other things. IEEE 802.11ax may also be referred to as high efficiency wireless LAN (WLAN) or HEW.

Certain embodiments herein may relate to communication between HEW devices or devices that comply with, or are otherwise compatible with, the 802.11ax standard. Other embodiments herein may relate to communication associated with legacy devices, whether between legacy devices or between a HEW device and a legacy device. A legacy device may refer to a device that complies with a wireless standard prior to (or other than) 802.11ax, in one embodiment. Example legacy devices may comply with the 802.11a, 802.11n, or 802.11ac wireless standards, as non-limiting examples.

The one or more networks 105 over which the devices in FIG. 1 may communicate may support various communication technologies and types of networks, such as WiFi, WiFi Direct, peer-to-peer (P2P), Near Field Communication (NFC), Bluetooth®, ultra wide band (UWB), Uniform Serial Bus (USB), Zigbee, various antenna systems (e.g., single antenna, sector antennas, and multiple antenna systems (such as multiple input multiple output (MIMO) systems), cellular networks, cable networks, radio networks, satellite networks, the Internet, intranets, or any number of wireless or wired networks.

Devices described herein may include a radio receiver. A physical layer interface in the radio receiver may include a radio frequency (RF) unit that may be configured to provide for reception of one or more RF signals at one or more frequencies. According to one configuration, the RF unit may include an amplifier, a mixer, a local oscillator, and so forth. The RF unit may be implemented as discrete electronic components, integrated circuits, software-defined radio, or a combination thereof, according to various configurations. Devices herein may further include a radio transmitter that may send one or more RF signals to one or more access points, such as the access points 140. In some configurations, devices may include a radio transceiver that may receive and send RF signals. A transceiver (or a receiver and transmitter) may be coupled to one or more antennas associated with the devices.

The user device 110 may include one or more processors configured to communicate with one or more memory devices and various other components or devices. For example, the user device 110 may include one or more devices that include one or more processors 112, one or more input/output (I/O) devices 114, storage 116, one or more communication connections 118, and one or more data stores 122. The one or more processors 112 may be implemented as appropriate in hardware, software, firmware, or a combination thereof. The one or more processors 142 of the access point 140 may be the same or at least similar to the processor 112.

The memory 124 may store program instructions that are loadable and executable on the processor 112, as well as data generated during the execution of these programs. Depending on the configuration and type of the user device 110, the memory 124 may be volatile, such as random access memory (RAM), static random access memory (SRAM), dynamic random access memory (DRAM); or non-volatile, such as read-only memory (ROM), Electrically Erasable Programmable Read-Only Memory (EEPROM), flash memory, etc. The memory 152 of the access point 140 may be the same or at least similar to the memory 124.

The storage 116 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The storage 146 of the access point 140 may be the same or at least similar to the storage 116.

The memories 124 and 152, and the storage 116 and 146, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data.

The I/O devices 114 may enable a user to interact with the user device 110 to perform various functions. The I/O devices 114 may include, but are not limited to, a keyboard, a mouse, a pen, a voice input device, a touch input device, a gesture detection or capture device, a display, a camera or an imaging device, speakers, and/or a printer. The I/O devices 144 of the access point 140 may be the same or at least similar to the I/O devices 114.

The communication connections 118 may allow the user device 110 to communicate with other devices, such as other user devices 110 and access points 140, over the one or more networks 105. The communication connections 118 may include one or more antennas 120 and one or more radios 119, which may include hardware and software for sending and/or receiving wireless signals over the various types of networks described above. The communication connections 148 of the access point 140 may be the same or at least similar to the communication connections 118.

The one or more data stores 122 may store lists, arrays, databases, flat files, etc. In some implementations, the data store 122 may be stored in a memory external to the user device 110 but may be accessible via one or more networks, such as with a cloud storage service. The data store 122 may store information that may facilitate the processes described herein. The stored information may be used to generate a packet for transmission to a receiving user device 110, among other uses.

The stored information may include common information shared between users or devices scheduled to receive communications, such as a type of packet to be transmitted; a partition designation of a frequency band, such as a number and bandwidth of subchannels in the frequency band; the number of spatial streams in each subchannel; the duration of a physical layer frame (e.g., the symbol duration), which may include one or more packets; and group identifiers for one or more groups of scheduled users or devices.

The stored information may also include particular information associated with each scheduled device or user, such as identification of a device or user (e.g., Media Access Control (MAC) address); a modulation coding scheme (MCS); a precise length of a physical layer frame, which may include one or more packets encoded according to the techniques described herein; and an indication of spatial streams for the user. Various other information may be stored in other examples.

Turning to contents of the memory 124, the memory 124 may include, but is not limited to, an operating system 126, a communication module 128, a scheduler module 130, and an encoding module 132, and a decoding module 134. Each of these computer program modules may be implemented as individual modules that provide specific functionality associated with wireless communication using combined channel training bits and physical layer header (SIG) bits in the physical layer header of a packet. Alternatively, one or more of these modules may perform all or at least a portion of the functionality associated with the other modules.

The operating system 126 may refer to a collection of software that manages computer hardware resources and provides common services for computer programs to enable and facilitate the operation of such programs. Example operating systems may include UNIX, Microsoft Windows, Apple OS X, Apple iOS, Google Android, Windows Phone, etc.

The communication module 128 may configure the user device 110 to communicate with devices on the network 105, such as the access point 140 or other user devices 110. Such communication may include broadcast and beamforming communication techniques, as will be described in greater detail below. In so doing, the communication module 128 may implement various techniques for modulating signals such as, but not limited to, Orthogonal Frequency Division Multiplexing (OFDM), Orthogonal Frequency Division Multiple Access (OFDMA), Dense Wave Division Multiplexing (DWDM), Phase Shift Keying (PSK), Binary Phase Shift Keying (BPSK), Frequency Shift Keying (FSK), Amplitude Shift Keying (ASK), Quadrature Amplitude Modulation (QAM), and Single Carrier (SC) modulation techniques.

The scheduler module 130 may perform functions associated with organizing information for transmission to a receiving device. For example, the scheduler module 130 may determine in which portion of the physical layer header (SIG) to store the information. Such functionality, as well as other functionality performed by the scheduler module 130, will be described in greater detail below.

The encoding module 132 may generate or modify a packet for sending to a receiving user device 110. In so doing, the encoding module 132 may communicate with the scheduler module 130 to obtain information for generating or modifying the packet, in one embodiment. The encoding module 132 may encode the packet using a modulation coding scheme (MCS) or other techniques prior to modulation of the packet to a receiving user device 110. The encoding module 132 may place symbols (e.g., a tone or pulse encoding or representing an integer number of bits) on a channel at a fixed and known symbol rate. Each symbol may have a duration over which a certain number of bits are transmitted. In certain embodiments herein, the symbol duration for physical layer header (SIG) bits may be four (4) times the symbol duration for legacy symbols. In one example, such a duration for transmitting the physical layer header (SIG) bits may be approximately 16.0 microseconds (μs) (e.g., within an acceptable tolerance of +/−10%, +/−15%, other configurable tolerance or deviation, etc.), or approximately four (4) times that of the legacy symbol duration of approximately 4.0 μs (e.g., within an acceptable tolerance of +/−10%, +/−15%, other configurable tolerance or deviation).

The encoded symbols placed on a channel (e.g., one or more subchannels) may be modulated by the communication module 128 as one or more signals to a receiving user device 110, where the signals may be demodulated and decoded. The techniques used to decode the signals will be described in greater detail below. The encoding module 132 may also organize or assemble packets into a frame for distribution to receiving user devices 110. Such a frame may include one or more packets generated according to the techniques described herein.

The encoding module 132 may also generate a packet for inclusion in a frame for transmission to a receiving user device 110. In one embodiment, the encoding module 132 may include a packet generation module for performing functions related to such generation. For example, the packet generation module may store information in the physical layer header portion of a packet. In so doing, the packet generation module may identify information for inclusion in the packet. Such information may include common information shared by all devices on the network 105, as well as particular information for each scheduled user or device. As described above, such information may be stored in a data store 122 or other network-accessible storage.

Figure 2:
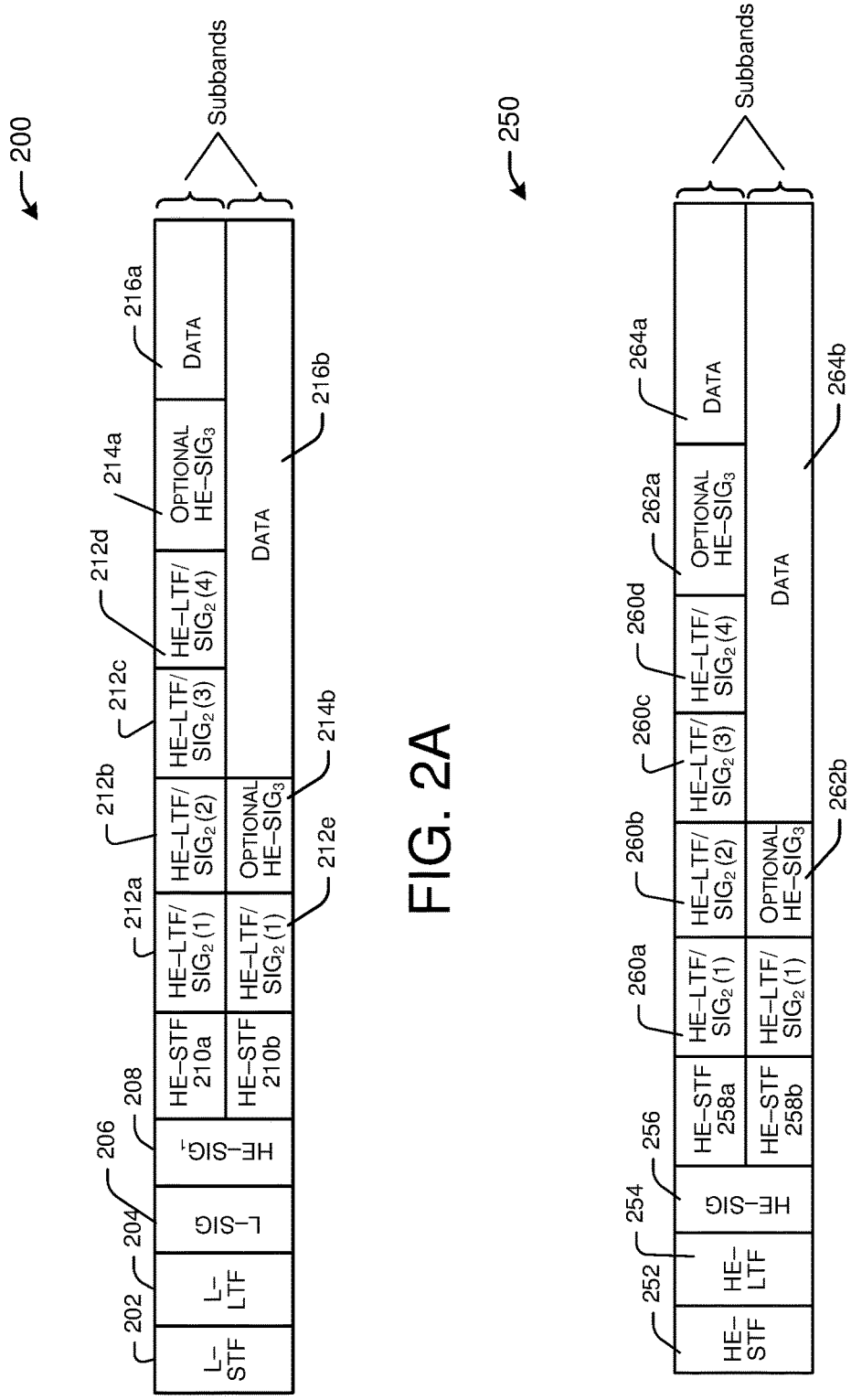
FIG. 2A illustrates an example packet in which channel training bits and physical layer header signaling bits have been combined for communication between legacy and high efficiency WLAN (HEW) devices, according to an embodiment of the disclosure.
FIG. 2B illustrates an example packet in which channel training bits and physical layer header signaling bits have been combined for communication between high efficiency WLAN (HEW) devices, according to an embodiment of the disclosure.

An example of a packet generated by the packet generation module is depicted in FIG. 2A. In one embodiment, the packet may comply with the 802.11ax, and may be suitable for transmission over a WiFi network or other type of network, such as the networks 105. As shown in FIG. 2A, a packet 200 may include various portions, such as a physical layer header portion and subsequent data portion. In certain embodiments herein, channel training bits may be combined with physical layer header (SIG) bits in the physical layer header portion. Such combining may take advantage of an increased symbol duration (e.g., four (4) times the legacy symbol duration), which may result in reduced subcarrier spacing of signals carrying the packet 200, and hence, relatively highly correlated channel responses of adjacent subcarriers. Utilization of such subcarriers to decode data will be described in greater detail below.

The packet 200 may be generated for sending to legacy devices, such as devices that comply with 802.11a, 802.11n, and 802.11ac standards, among others. For example, the packet 200 may include an L-STF 202 (legacy short training) field, an L-LTF 204 (legacy long training) field, and an L-SIG 206 (legacy signal) field to facilitate such communication. The "L" prefix for the fields may indicate that the fields are legacy field. In one embodiment, these legacy fields may be associated with a one (1) time symbol, and may each have bits that are modulated during a one (1) time symbol duration of 4.0 μs, or other symbol duration.

The L-STF 202, an L-LTF 204, and an L-SIG 206 fields may be used to train broadcast communication between the devices in FIG. 1, in one embodiment. For example, the L-STF 202 field may include one or more signals that may enable a user device 110 that receives the packet 200 to adjust its Automatic Gain Control (AGC) to facilitate receiving subsequent information from a user device 110 (or an access point 140) that sends the packet 200. The receiving user device 110 may adjust its AGC to a suitable level or range to enable receipt of broadcast information from the sending user device 110. The information in the L-STF 202 may therefore enable the receiving user device 100 to determine the rough (or approximate) boundary of an OFDM signal and subsequently determine a channel response on the OFDM signal, as will be described in greater detail below.

The L-LTF 204 field may include information that may enable channel estimation of a channel used for communication between the devices in FIG. 1. For example, the L-LTF 204 field may include channel training signals that may train a broadband channel used for such communication. The channel training signals may include symbols (e.g., +1.0, −1.0, +0.3, etc.) such that a receiving device in FIG. 1 may determine the signal constellation of a signal received from a sending device and subsequently decode the data in the signal based on the determined constellation of the signal. Various channel training techniques may be used to implement training of a channel for broadband communication.

The L-SIG 206 field may include rate and length (e.g., duration) information for a channel (e.g., a subchannel). The duration information may cause a device receiving the packet 200 not to contend for the channel for communication during the duration. In certain embodiments herein, such a receiving device may be an unscheduled or unaddressed device, or put another way, a device to which subsequent data is not intended for distribution. The duration information may be obtained from a field other than the L-SIG 206 field in some embodiments. For example, the duration information may be obtained from a trigger frame or a channel reservation frame that precedes a data burst.

Fields prefixed with "HE" may refer to high efficiency fields associated with the 802.11ax standard. As shown, the packet 200 in FIG. 2A may include an HE-SIG field that includes three portions, in one configuration. The left most portion may be the HE-SIG$_1$ 208 field, followed by the HE-LTF/SIG$_2$ 212a-e fields, and the HE-SIG$_3$ 214a,b fields, as shown.

The encoding module 132 in FIG. 1 may store all or at least a portion of the common information (or other information) for an entire bandwidth or channel (e.g., 20 MHz, 40 MHz, 80 MHz, etc.) in the HE-SIG$_1$ 208 field. An example of common information may include an indication of an 802.11ax packet, such as the packet 200. Another example of common information may include the bandwidth of the receiving packet such as 20 MHz, 40 MHz, 80 MHz, etc. A third example of common information may include the duration of the HE-SIG$_1$ 208 field. The duration may be in the number of OFDM or OFDMA symbols or microseconds. The receiver may need to know the starting time of HE-STF 210, which follows the HE-SIG$_1$ field, such that the AGC hardware may be unlocked and reset for the subsequent HE-LTF/SIG$_2$ 212 field, which may be beamformed. In one embodiment, an 802.11ax packet may be signaled by including a scrambled Cyclic Redundancy Check (CRC) in the HE-SIG$_1$ 208 field. The receiving device may determine that the packet 200 is an 802.11ax packet, and unscramble and perform the CRC. In another embodiment, an 802.11ax packet may be signaled by the signal structure of the HE-SIG$_1$ 208 field. For example, some portions of HE-SIG$_1$ 208 field may be sent twice.

Common information stored in the HE-SIG$_1$ 208 field may also include the partition combination of a frequency band. In one example, a 20 MHz band may be allocated as an entire piece or bandwidth to all devices or users scheduled for communication. In other examples, such as that shown in FIG. 2A, the bandwidth may be partitioned into portions, such as two subchannels or subbands, one with approximately 8.125 MHz and the other with approximately 10.15625 MHz. In the present example, therefore, the HE-SIG$_1$ 208 field may indicate that the two subchannels or subbands are used to transmit one or more frames that include one or more packets 200. If the minimum bandwidth is approximately 2.03125 MHz, for example, then 3-9 bits may be required to specify all partition combinations and permutations for a 20 MHz frequency band.

Common information stored in the HE-SIG$_1$ 208 field may further include a number of spatial streams in each subchannel. As an example, the first approximately 8.125 MHz subchannel in FIG. 2A has four spatial streams, while the second approximately 10.15625 MHz subchannel has two spatial streams. Any number of subchannels and spatial streams may be used in other examples.

Common information stored in the HE-SIG$_1$ 208 field may further include a group identification of scheduled users. An access point, such as the access point 140 in FIG. 1, may assign users to different groups and use the group identification to indicate a group of users. The indicated group of users may be used for communicating information or other purposes. Instead of a group identification of scheduled users, in some embodiments, common information stored in the HE-SIG$_1$ 208 field may simply include the identifications of the scheduled users at the cost of more overhead.

Common information stored in the HE-SIG$_1$ 208 field may further include a partial cell identification. The partial cell identification may cause irrelevant or unscheduled devices associated with an access point that is not used in communicating information in the packet 200 to terminate their receptions so that the devices may conserve power.

Common information stored in the HE-SIG$_1$ 208 field may further include timing information, such as a time at which an HE-STF 210a,b fields may be received. Upon receiving such information, a receiving device may adjust its AGC accordingly using HE-STF 210a,b without any delay. In some embodiments, the receiving device may power down until such time. Upon receipt of the HE-STF 210a,b field, the receiving device may adjust its AGC accordingly to facilitate receiving subsequent beamformed information. In one embodiment, the timing information that determines the starting time of HE-STF with respect to the termination time of L-SIG may be broadcast by a beacon.

While the examples above describe storing certain common information in the HE-SIG$_1$ 208 field, only a portion of such information may be stored in the HE-SIG$_1$ 208 field by the encoding module 132 in some examples. By storing a relatively limited amount of information in the HE-SIG$_1$ 208 field (which may be broadcast) in favor of storing relatively more information in the HE-SIG$_2$ and/or HE-SIG$_3$ portion of the physical layer header (which may be beamformed), coverage and reliability of transmissions may be enhanced, and overhead may be reduced. Benefits associated with beamforming may therefore be realized for at least a portion of the HE-SIG, whereas such benefits may not have been realized before.

An example of a limited amount of information stored in the HE-SIG$_1$ 208 field may be information indicating a packet type of 802.11ax and/or the partition combination of a frequency band. Although the total bandwidth illustrated in FIGS. 2A and 2B are 20 MHz, the frequency bandwidth of the HE portion, such as HE-SIG$_1$ and data, such as the data 216a and 216b, may be 20, 40, 80, or 160 MHz. For a bandwidth that is a multiple of 20 MHz, the legacy portions (e.g., L-STF, L-LTF, and L-SIG) may be repeated on the constituent 20 MHz subchannels. In contrast, the HE portion, such as HE-SIG$_1$, may be sent over the total bandwidth without repetition, in one embodiment. For example, the beginning part of HE-SIG1 with one or more OFDM symbols may be sent over 20 MHz subchannels repeatedly, but the rest of the HE portion, including the remaining portion of the HE-SIG$_1$, may be sent over the entire bandwidth without repetition.

The information indicating a packet type of 802.11ax and/or the partition combination of a frequency band may be stored in the HE-SIG$_1$ 208 field in instances in which the HE-SIG$_1$ 208 field has only one symbol with the legacy symbol duration (e.g., not the four (4) times symbol duration associated with certain embodiments herein). Additional information may be stored in the HE-SIG$_1$ 208 field, after storing one or both of the information indicating a packet type of 802.11ax and/or the partition combination of a frequency band, if space for storing more bits exists. Example additional information may include, but is not limited to, the number of spatial streams for each subchannel, or the frame duration. In this way, information may be iteratively stored in the HE-SIG$_1$ 208 field (e.g., by the encoding module 132) until the HE-SIG$_1$ 208 field is filled. Processes associated with storing information in portions of the HE-SIG fields will be described in greater detail below.

The above examples of storing information in the HE-SIG$_1$ 208 field are for purposes of illustration and are not meant to be limiting. Any of the common information described above, as well as other information, may be stored in any sequence in the HE-SIG$_1$ 208 field in other examples.

In one embodiment, the HE-STF 210a,b fields may signal the beginning of a beamforming transmission. A first HE-STF 210a fields may be used for a first approximate 8.125 MHz subchannel, while a second HE-STF 210b field may be used for a second approximate 10.15625 MHz subchannel, in the example of FIG. 2A. The HE-STF 210a,b fields may include information that causes a receiving device to reset its AGC (e.g., from an initial setting caused by the L-STF 202 field) in anticipation of receiving subsequent portions of the HE-SIG (e.g., HE-LTF/SIG$_2$ 212a-e fields and HE-SIG$_3$ 214a,b fields) and data. Such information may be received via beamforming in certain embodiments herein.

As mentioned above, the second portion of the HE-SIG may be the HE-LTF/SIG$_2$ 212a-e fields. The HE-LTF/SIG$_2$ 212a-e fields may carry information for each scheduled user or device. Such information may be combined with channel training signals, which may be used to train beamformed channels. The designation of HE-LTF/SIG$_2$(X) in the packet 200 may indicate such a combination, where X is the HE-LTF symbol index for a subchannel as described above. Put another way, HE-LTF/SIG$_2$(X) may also be interpreted herein as referring to both HE-LTF(X) and HE-SIG$_2$(X).

As described above, the scheduler module 130 may determine where to store information for each scheduled device. In one embodiment, the scheduler module 130 may attempt to store common information in the HE-SIG$_1$ 208 field and device-specific information in the HE-LTF/SIG$_2$ 212a-e fields along with channel training signals. In so doing, the scheduler module 130 may determine a number of bits available for the HE-SIG$_2$(X) in the combined HE-LTF/SIG$_2$(X) 212a-e fields after channel training subcarriers that carry the channel training signals have been reserved in such fields. A number of bits associated with the information for scheduled devices may be compared to the available bits, and when space remains (e.g., more bits can be stored in the combined field), then the information for the scheduled devices may be stored in the same field with the channel training signals. If space is no longer available for storing at least a portion of device-specific information, then the remaining portion of device-specific information may be stored in the optional field HE-SIG$_3$ 214a or 214b, in one embodiment. The HE-SIG$_3$ 214a,b fields, similar to the HE-LTF/SIG$_2$ 212a-e fields, may be beamformed using spatial multiplexing, for example, in Multi-User Multiple-Input Multiple-Output (MU-MIMO) mode or operation.

In similar fashion to that described above, the scheduler module 130 may store common information in the HE-SIG$_1$ 208 field. For example, common information may be stored in the HE-SIG$_1$ 208 field as long as space remains available. If any portion of the common information may not fit within the HE-SIG$_1$ field, then such a portion may be stored in either of the HE-LTF/SIG$_2$ 212a-e fields or the optional HE-SIG$_3$ 214a,b fields. In one embodiment, the encoding module 132 may first store common information that does not fit within the HE-SIG$_1$ 208 field in the HE-LTF/SIG$_2$ 212a-e fields (if space remains in these fields), and may secondarily store information in the optional HE-SIG$_3$ 214a,b fields.

As described above, the encoding module 132 may store various information in the HE-LTF/SIG$_2$ 212a-e fields. In one configuration, such information may enable channel estimation of a channel used for communication between the devices in FIG. 1. For example, all or at least a portion of the HE-LTF/SIG$_2$ 212a-e fields may include channel training signals that may train a broadband channel used for such communication. The channel training signals may include symbols (e.g., +1.0, −1.0, +0.3, etc.) such that a receiving device in FIG. 1 may determine the constellation of a signal, adjust its phase and magnitude accordingly based on the training symbols, and subsequently decode the data in the signal based on the determined constellation of the signal. In certain embodiments herein, such training symbols may be combined with physical layer header (SIG) signaling bits to effectively reduce the overhead of channel training, as will be described in greater detail below.

The physical layer header (SIG) signaling bits may correspond to information for each scheduled user. Such information may be stored by the encoding module 132 in the HE-LTF/SIG$_2$ 212a-e fields, as described above. The information may include a modulation coding scheme (MCS). The MCS may inform a receiving device about how to demodulate and demultiplex subsequent data (e.g., the data 216a and 216b) in the corresponding spatial stream. For example, the MCS may include an indication of a physical layer modulation scheme or order (e.g., BPSK, etc.), a code rate (e.g., one-half or lower, etc.), or a mode (e.g., diversity mode, multiplexing mode, beamformed mode, etc.). The MCS information may be 3-6 bits, in one configuration, although any number of bits may be used in other configurations. In some embodiments, all or at least a portion of the MCS information may be stored in the HE-SIG$_1$ 208 field.

The information in the HE-LTF/SIG$_2$ 212a-e fields may also include the allocation of streams to a user or device (e.g., the user device 110 in FIG. 1). For example, all or at least a portion of the spatial streams HE-LTF/SIG$_2$(1) 212a, HE-LTF/SIG$_2$(2) 212b, HE-LTF/SIG$_2$(3) 212c, HE-LTF/SIG$_2$(4) 212d, and HE-LTF/SIG$_2$(1) 212e may be designated for a particular user. Portions of such a spatial stream designated for a user may be indicated in one or more of the HE-LTF/SIG$_2$ 212a-e fields. For example, two of the four spatial streams HE-LTF/SIG$_2$ 212a-d in the first approximate 8.125 MHz subchannel (e.g., the spatial streams HE-LTF/SIG$_2$(1) 212a and HE-SIG$_2$(2) 212b) may be allocated to a device. The device may parse the allocation of spatial streams to determine which of the four spatial streams, in the present example, are designated for the device. In some embodiments, a resources map may indicate an allocation of spatial streams to a user or device. A receiver device may identify its spatial streams in the resources map in these embodiments.

In one embodiment, if a user has more than one spatial stream, then HE-SIG$_2$ in one stream (e.g., of the streams HE-LTF/SIG$_2$ 212a-e) may indicate the allocation of the other streams for the same user. Such allocation may provide reception diversity by enabling a device to identify its allocation using multiple streams in instances in which the HE-SIG$_2$ in one stream is not decoded properly.

The information in the HE-LTF/SIG$_2$ 212a-e fields may also include a user or device identification (e.g., a MAC address). A receiver device may use the user identification to determine whether subsequent data is designated for the receiver device. In one embodiment, the receiver device may stop decoding information upon identifying a device identification associated with HE-SIG$_2$ information that is not intended for the receiver device. The receiver device may instead enter power save mode when HE-SIG$_2$ information is not intended for it, in one embodiment. In some embodiments, the receiver device may identify a device identification in the data portion in addition to, or as an alternative, to identifying the device identification in one or more of the HE-LTF/SIG$_2$ 212a-e fields. Further, a receiver device may determine which spatial stream has its data upon identifying which HE-LTF field (e.g., the combined HE-LTF/SIG$_2$ 212a-e fields) includes the user or device identification.

The user identification may be a full or partial user identification. The user identification may also be referred to as an access identification (AID). A full AID may be approximately 14 bits, whereas a partial AID may be approximately 10 bits. In some configurations, the user identification may be between 7 and 14 bits. Any number of bits for the full or partial AID, or other user identification, may also be used. In one embodiment, the AID may be linked to information for the user or receiver device in the resources map. The receiver may identify information designated for it in the resources map by using its AID.

The information in the HE-LTF/SIG$_2$ 212a-e fields may further include the length (e.g., the precise length) of the physical layer frame. Because the physical layer header information for one user may not completely fill the entire duration for a data burst with multiple users (e.g., four (4) times symbol duration), the encoding module 132 in FIG. 1 may indicate the physical layer duration for each user or device. Put another way, only a portion of the data 216a or 216b may be intended for one user or device. For example, a first receiver device may only use 240 μs of a total 1600 μs (e.g., when four (4) times the legacy symbol duration is used). According to this example, the 240 μs duration may be indicated such that the receiver device may determine whether it may stop decoding, for example, when it has reached a 240 µs duration.

In one embodiment, the precise length of the physical layer frame may be indicated by the encoding module 132 in FIG. 1 if there is space in the HE-LTF/SIG$_2$ 212a-e fields. If there is not space in the HE-LTF/SIG$_2$ 212a-e fields, then the encoding module 132 may indicate the precise length in either of the HE-SIG$_1$ 208 field or the optional HE-SIG$_3$ 214a or 214b field.

Various other information for each scheduled user, as well as common information, may be stored in the physical layer header portion of the packet 200 in other examples.

In some embodiments, a green field mode may be used to communicate information between devices, such as the devices in FIG. 1. The green field mode may refer to information that is communicated between non-legacy devices, such as devices that comply with the 802.11ax or HEW standard. An example packet for green field mode communication may be the packet 250 in FIG. 2B. The process of combining channel training bits with physical layer header (SIG) signaling bits in the physical layer header on the packet 250 may be the same or similar to process of combining bits for these fields in the packet 200, in one embodiment.

As shown in FIG. 2B, the packet 250 may include an HE-STF 252, HE-LTF 254, and HE-SIG$_1$ 256 field. Such fields may be used to train a channel for broadcast communication in similar fashion to their counterpart fields for legacy devices (e.g., L-STF, L-LTF, and L-SIG as shown in the packet 200). The remaining portion of the packet 250 may be the same or similar to the packet 200. For example, the HE-STF 258a and 258b fields may be used for the same or similar purpose as their counterpart HE-STF 210a and 210b fields in the packet 200. The HE-LTF/SIG$_2$ 260a-e fields may be used for the same or similar purpose as their counterpart HE-LTF/SIG$_2$ 212a-e fields in the packet 200. The optional HE-SIG$_3$ 262a and 262b fields may be used for the same or similar purpose as their counterpart HE-SIG$_3$ 214a and 214b fields in the packet 200. The data 264a and 264b may represent data on subchannels for carrying information associated with the packet 250.

In one embodiment, the packet 250 may not include an L-SIG field, as indicated by FIG. 2B. According to this embodiment, the duration of an entire frame may be indicated. The duration may be indicated in the HE-SIG$_1$ 208 field along with other common information as described above, in one embodiment. The duration may be indicated in the unit of four (4) times the symbol duration of a legacy duration or a multiple of four (4) times symbol duration.

Returning to FIG. 1, the decoding module 134 of the user device 110 may perform functions associated with decoding a frame that includes one or more packets (e.g., the packet 200 in FIG. 2A) generated according to the techniques described herein. For example, the decoding module 134 may determine information that may be used to decode a signal that includes such a frame. In one embodiment, such information may include the common information stored in the HE-SIG$_1$ 208 field described above such as, but not limited to, an indication of a type of the packet (e.g., 802.11ax), the partition combination of the frequency band, and the number of spatial streams in each subchannel.

To facilitate determining information that may be used to decode the frame, the decoding module 134 may perform channel training for a broadcast channel that may be used to receive the information. In so doing, the decoding module 134 may set an automatic gain control (AGC) of the user device 110 based at least in part on a short training field (STF) (either L-STF for legacy mode or HE-STF for green mode) received from a sending device, such as the access point 140 or a sending user device 110. The decoding module 134 may thereafter train the broadband channel using one or more long training fields (LTF) (whether L-LTF for legacy mode or HE-LTF for green mode) received from the sending device.

After the user device 110 receives a signal including the beamformed portion of the physical layer header (e.g., the HE-LTF/SIG$_2$ 212a-e fields in FIG. 2A) and subsequent data, the decoding module 134 may analyze the portion of the physical layer header to facilitate decoding the received data. For example, the decoding module 134 may determine user or device-specific information in the physical layer header portion, and use such information to determine various information such as, but not limited to, a modulation coding scheme (MCS) and its portion of data in the frame.

The decoding module 134 may analyze the combined channel training bits and physical layer header (SIG) signaling bits to facilitate decoding the signal. In one embodiment, the HE-LTF/SIG$_2$ 212a-e fields in FIG. 2A may include the combined bits. All or at least a portion of these fields may be associated with a particular user device utilizing the decoding module 134 to decode a received signal.

In certain embodiments herein, the channel training bits and physical layer header (SIG) bits may be received at the same time, for example, in one symbol. Prior communication techniques relate to devices that may have sent channel training bits in one or more symbols at a first time and thereafter sent the physical layer header (SIG) bits in one or more different symbols at a subsequent time, thereby utilizing at least two symbols to communicate such information. Put another way, prior techniques may have used each tone in a symbol for channel training, whereas certain embodiments herein use at least one tone for carrying channel training bits and at least one tone (within the same symbol) for carrying physical layer header (SIG) bits (e.g., data associated with the HE-LTF/SIG$_2$ 212a-e fields in FIG. 2A). In certain embodiments herein, therefore, at least one symbol may not be required to transmit the same amount of information that was transmitted in previous communication techniques.

Figure 3:
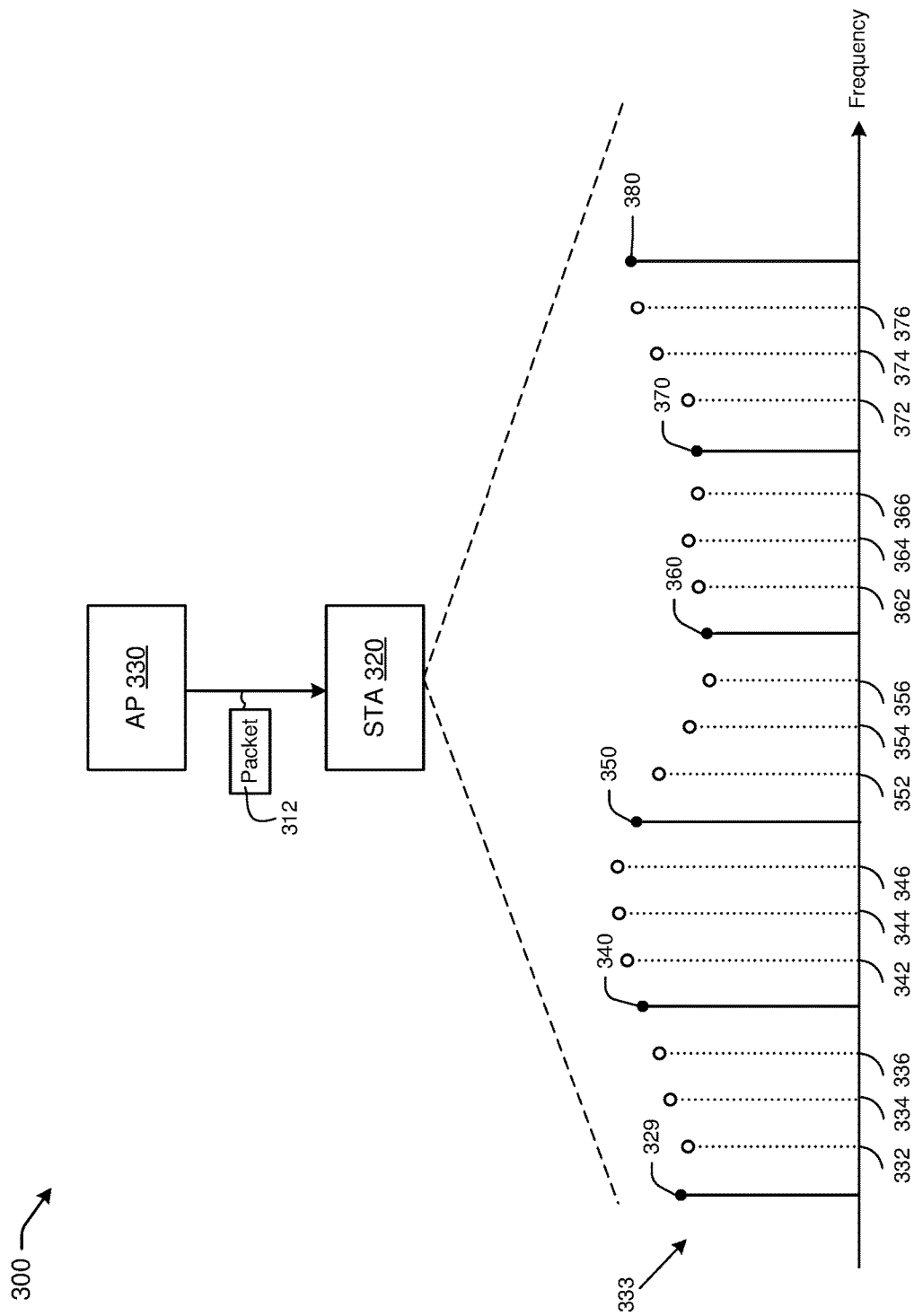
FIG. 3 illustrates an example chart depicting subcarriers carrying channel training sequences interlaced with physical layer header bits in the frequency domain, according to an embodiment of the disclosure.

FIG. 3 depicts a system 300 that includes devices that may encode and decode signals according to the techniques described herein. A signal 333 that includes subcarriers (or tones) carrying channel training sequences interlaced with subcarriers (or tones) carrying physical leader header (SIG) bits in the frequency domain is shown. The channel training subcarriers may be represented by the solid lines, while the tones carrying the physical layer header (SIG) data may be represented by the dotted lines.

As shown in FIG. 3, an access point (AP) 330 may send the packet 312 to the station STA 320, where the signal 333 may be decoded (e.g., by the decoding module 134 in FIG. 1). The access point may also generate the packet 312, for example, via the scheduler module 158 and the encoding module 160 according to the techniques described herein, in one embodiment. In some embodiments, a station (not shown) may generate the packet 312 according to the techniques described herein and send the packet 312 to the STA 320. According to these embodiments, the station sending the packet 312 may serve as a group owner of a peer-to-peer group, or may otherwise be configured to communicate with one or more stations.

In one embodiment, the packet 312 may be embodied by the packet 200 in FIG. 2A. STA 320 may be embodied by the user device 110 in FIG. 1, and the access point 330 may be embodied by the access point 140 in FIG. 1. The access point 330 and STA 320 may communicate with each other using the 802.11ax WiFi standard, in certain embodiments herein.

In one embodiment, the decoding module 134 may include a channel estimation module 136. The channel estimation module 136 may perform functions associated with determining a channel response. For example, the channel estimation module 136 may use information from each of the tones as training data such that training may be improved after analysis of each tone in succession, thereby enabling the final data in the signal 333 to be obtained. For example, information from data tones (e.g., tones 342, 344, and 346), in addition to channel training tones (e.g., tone 340), may be used to estimate the channel response, as described in greater detail below. Such an iterative process of estimating channel responses may be referred to herein as decision feedback channel estimation or data-aided channel estimation.

By virtue of using an increased symbol duration that is four (4) times that of a legacy symbol in certain embodiments herein, the subcarrier spacing may be reduced by four (4) times. The subcarriers carrying the physical layer header (SIG) bits, as a result, may be highly correlated with (e.g., nearly the same or approximately the same) the adjacent channel training subcarriers. In one embodiment, a receiving device may use the channel responses of the adjacent trained subcarriers to approximate the channel responses of the subcarriers carrying the physical layer header (SIG) bits. The approximated channel responses may be used to demodulate the HE-SIG$_2$ signals carried by the physical layer header (SIG) subcarriers interleaved with the trained subcarriers, in one embodiment.

An example of estimating a channel response implemented by the channel estimation module 136 in FIG. 1 may be as follows. The signal 333 may be decoded in one example. As shown, the signal 333 may include channel training subcarriers 329, 340, 350, 360, 370, and 380. Interleaved with these channel training subcarriers may be physical layer header (SIG) subcarriers 332, 334, 336, 342, 344, 346, 352, 354, 356, 362, 364, 366, 372, 374, and 376. In one embodiment, every fourth subcarrier may be used for initial channel training Every second, third, or any other number of a repeating subcarrier may be used in other examples.

The channel estimation module 136 may begin channel training with the first training subcarrier 342. For example, the channel estimation module 136 may determine a training symbol (e.g., +1.0, −1.0, etc.) associated with the channel training subcarrier 342. The channel estimation module 136 may use the determined training symbol to perform a rough estimate of the channel response for the signal 333. In so doing, the channel estimation module 136 may perform channel interpolation to estimate the channel response for the data subcarriers 342, 344, and 346. The interpolated channel response may be used to decode or detect the data subcarriers 342, 344, and 346. The detected data symbols may be used as training symbols to refine the previous rough channel estimates. For example, if a data symbol of −1.0 (or any other value) is detected across the data subcarriers 342, 344, and 346, then such a data symbol may be used to calibrate channel distortion such that the full channel response (e.g., for every tone) may be determined, in one embodiment.

In the above fashion, the channel estimation module 136 may further refine the rough channel estimate by analyzing adjacent subcarriers 352, 354, 356, adjacent subcarriers 362, 364, and 366, and so forth, to determine data symbols associated with these adjacent subcarriers. The data symbols may be used as training symbols to further refine the rough channel estimate, as described above. In this way, the channel training tones represented by the solid lines in FIG. 3 may be used together across a frequency subband to estimate the data on the physical layer header (SIG) subcarriers (e.g., the dotted lines). Put another way, the channel training tones may be used to determine a rough estimate of a channel response, while the data tones represented by the dotted lines may provide additional data samples that may be used jointly with the channel training tones to refine the rough estimate of the channel response.

In certain embodiments herein, refining the rough channel estimate may be facilitated by encoding data in the HE-LTF/SIG$_2$ 212*a-e* fields in FIG. 2A (e.g., by the encoding module 132) using relatively low complexity techniques. One such technique may include BCC encoding, BPSK modulation, and a code rate of one-half or lower, in one embodiment.

The memory 152 associated with the access point 140 may include the same or similar modules as those stored in the memory 124 of the user device 110, in one embodiment. For example, the memory 152 may include a scheduler module 158, an encoding module 160, and a decoding module 162. The scheduler module may perform the same or similar functions as the scheduler module 130 of the user device 110, in one embodiment. The encoding module 160 may perform the same or similar functions as the encoding module 132 of the user device 110, in one embodiment. The decoding module 162 may perform the same or similar functions to the decoding module 134 of the user device 110, in one embodiment. The decoding module 162 may also include a program module that performs the same or similar functions as the channel estimation module 136 of the user device 110. The access point 140 may therefore may be configured to encode and decode packets according to the techniques described herein. The memory 152 may also include an AP communication module 156 that may configure the access point to send information to, and/or receive information from, the devices shown in FIG. 1. The AP communication module 156 may also configure the access point 140 to route information between user devices 110.

The above descriptions in FIG. 3 are for purposes of illustration and are not meant to be limiting. For example, although the power associated with each tone may appear to be similar, the power may differ for each tone. A relatively lower amount of power may be used for the channel training tones, as compared to previous systems, due to a shared power budget for both training and data tones, in some embodiments. Also, although a certain number of subcarriers and devices are shown in FIG. 3, fewer or more subcarriers and devices may exist in other examples. Further, only a portion of the modules shown in the devices 110 and 140 may exist in the memory 124 or the memory 152, respectively. For example, one user device 110 may be configured to encode packets according to techniques described herein using the encoding module 132, while another user device 110 may be configured to decode such packets using the decoding module 134.

Figure 4:
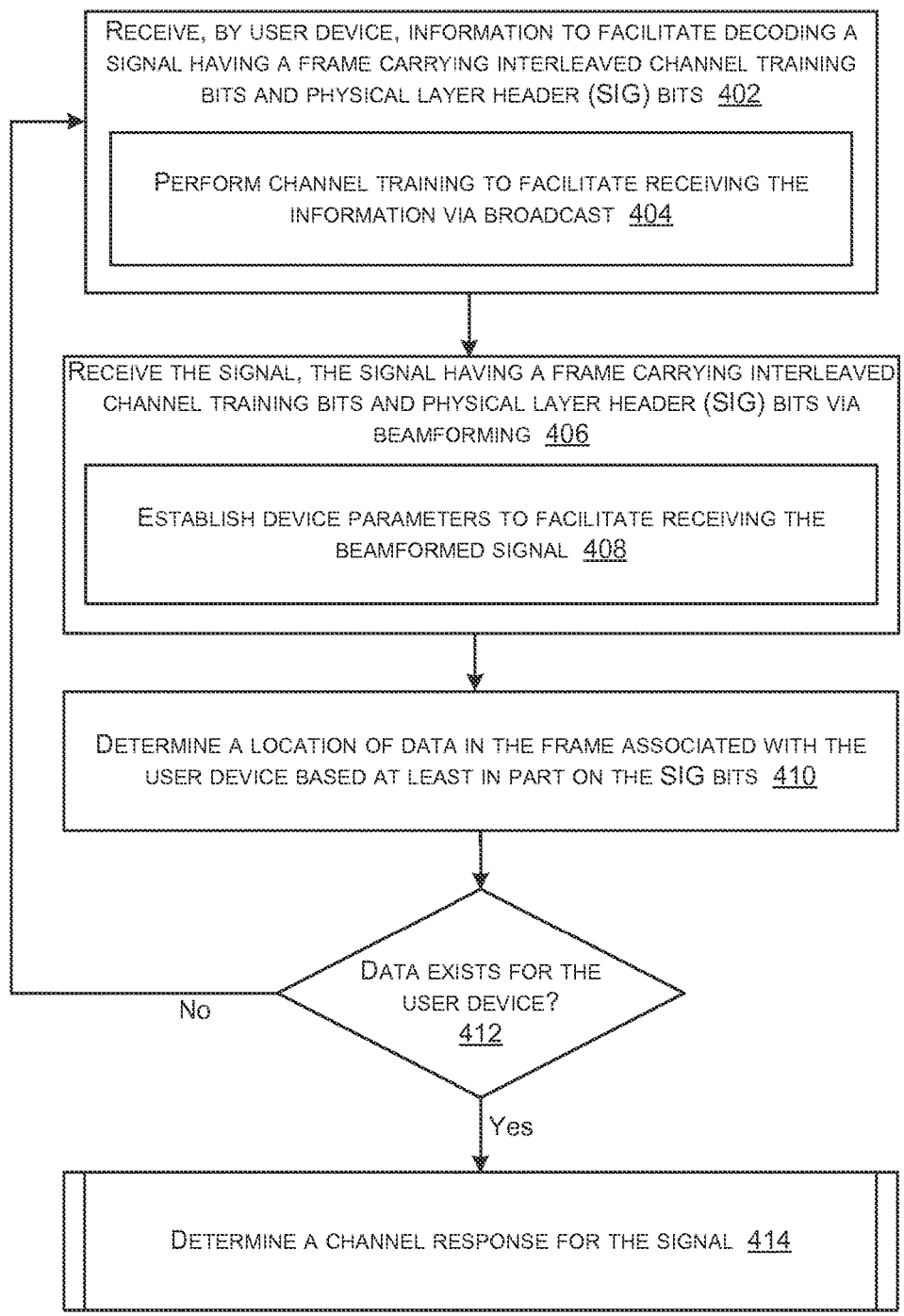
FIG. 4 illustrates a flow diagram of an example process for decoding a signal in which channel training bits and physical layer header (SIG) bits have been combined, according to an embodiment of the disclosure.

FIG. 4 depicts a flow diagram of an example process 400 for decoding a signal in which channel training bits and physical layer header (SIG) bits have been combined, according to an embodiment of the disclosure. In one embodiment, the example process 400 may be implemented by a user device, such as the user device 110 in FIG. 1, and may include decoding a packet, such as the packet 200 in FIG. 2A (or the packet 250 in FIG. 2B). The example process 400 may begin at block 402, where information to facilitate decoding of a signal having a frame carrying interleaved channel training bits and physical layer header (SIG) bits (HE-SIG$_1$ 208) may be received. In one embodiment, the signal may be received via a broadcast channel (e.g., by the communication module 128).

Channel training may be performed on the broadcast channel to facilitate receiving the decoding information (e.g., via the communication module 128) at block 404. Such channel training may include receiving a short training field (STF) (e.g., L-STF 202) and adjusting an automatic gain control (AGC) of the user device in response to receiving the STF. The channel training may further include receiving a long training field (LTF) (e.g., L-LTF 204) and calibrating channel distortion using the LTF.

At block 406, the signal having a frame carrying interleaved channel training bits and physical layer header (SIG) bits (e.g., HE-LTF/SIG$_2$ 212a-e fields) may be received via beamforming (e.g., via the communication module 128). The signal may include subcarriers carrying information for the channel training bits and the physical layer header (SIG) bits. To facilitate receiving the signal, initial settings for the user device may be established at block 408. For example, the user device may receive an STF (e.g., HE-STF 210a and/or 210b), and in response, may set its AGC based on the STF to enable receipt of the signal.

At block 410, a location of data in the frame associated with the user device may be determined based at least in part on the physical layer header (SIG) bits. If data exists for the user device at block 412, then a channel response for the signal may be determined at block 414, as further described in association with FIG. 5 below. If data does not exist for the user device, then processing may return to block 402.

Figure 5:
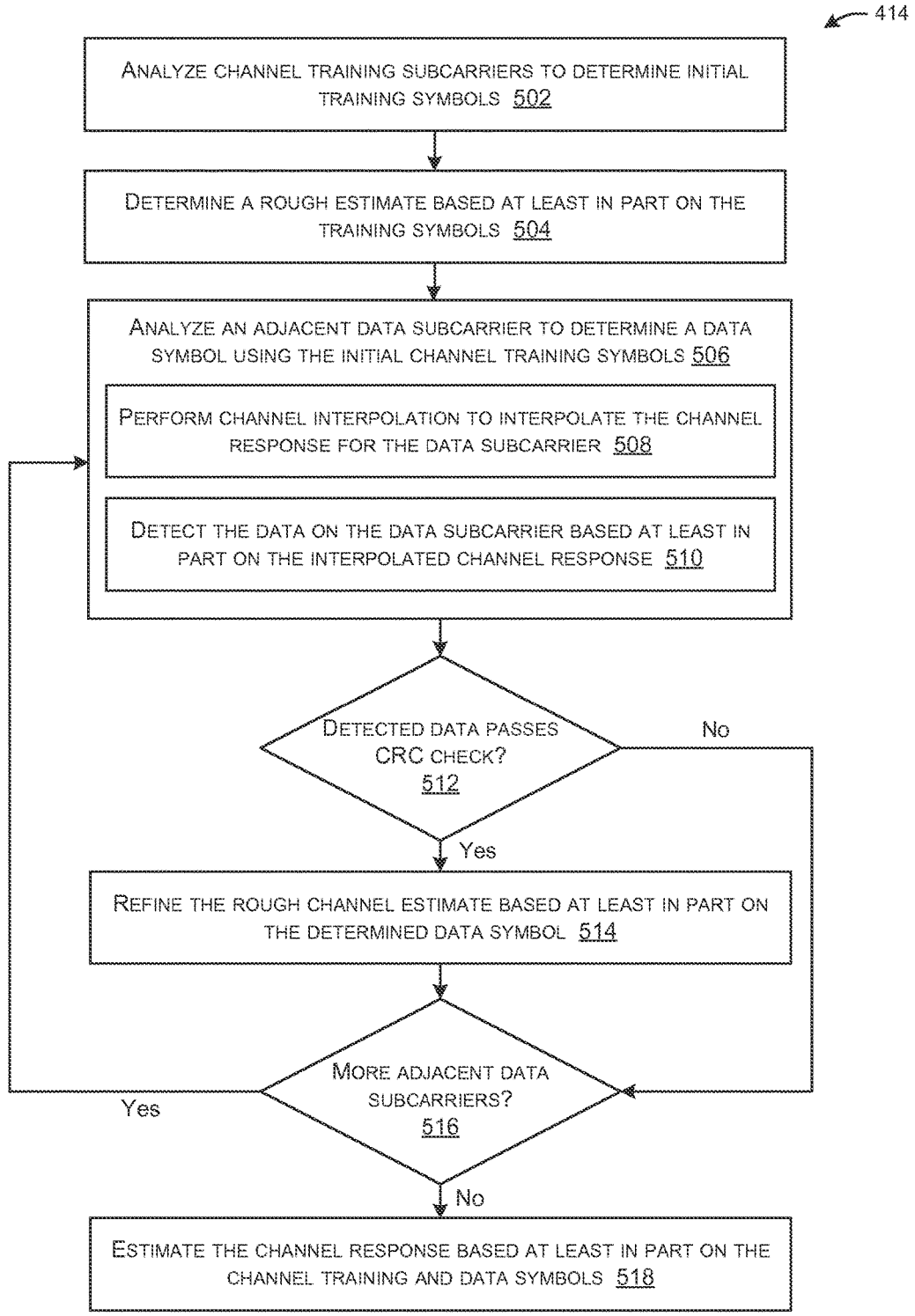
FIG. 5 illustrates a flow diagram of an example process for estimating a channel response for the signal described in FIG. 4, according to an embodiment of the disclosure.

FIG. 5 depicts a flow diagram of an example process 414 for estimating a channel response for the signal described in FIG. 4, according to an embodiment of the disclosure. The example process 414 may begin at block 502, where the channel training subcarriers may be analyzed to determine initial training symbols. A rough channel estimate may be determined based at least in part on the initial training symbols at block 504. In certain embodiments herein, a relatively low number of channel training symbols may be used to estimate the channel, and subsequent data symbols may be determined to refine the rough channel estimate.

At block 506, an adjacent data subcarrier may be analyzed to determine a data symbol using the initial channel training symbols. Such a determination may include performing channel interpolation to interpolate the channel response for the data subcarrier at block 508. The data on the data subcarrier may be detected based at least in part on the interpolated channel response at block 510. If the detected data passes a CRC at block 512, then the rough channel estimate may be refined based at least in part on the determined data symbol at block 514. In this way, data symbols may be used as training symbols in conjunction with channel training symbols to refine channel estimates. If the detected data does not pass a CRC, then processing may continue at block 516 where it is determined whether more adjacent data subcarriers exist.

If more adjacent data subcarriers exist at block 516, processing may return to block 506, where the next adjacent subcarrier may be analyzed to determine a data symbol on that subcarrier. If more adjacent subcarriers do not exist, then the channel response may be estimated based at least in part on the detected data and channel training symbols at block 518.

Figure 6:
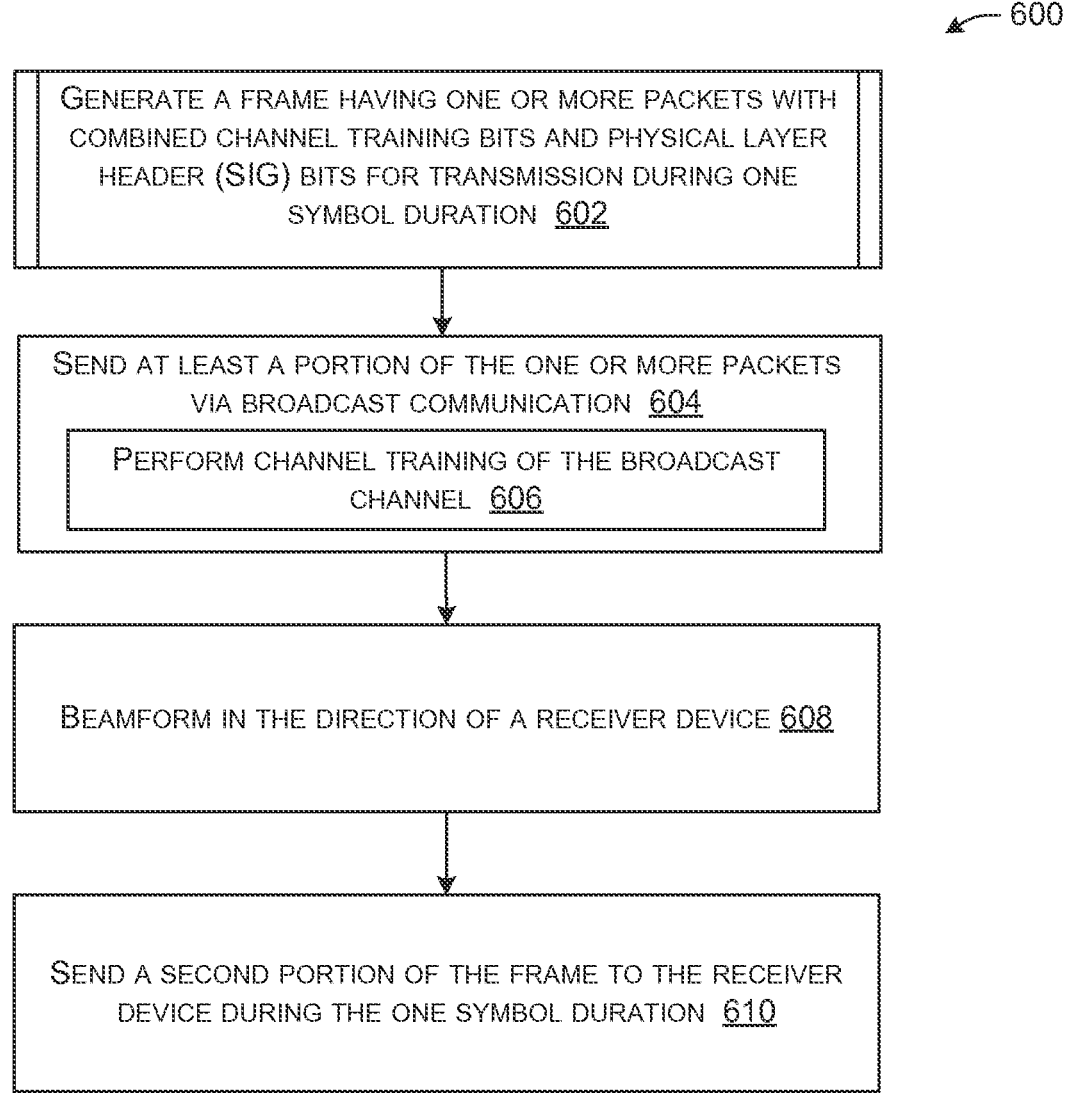
FIG. 6 illustrates a flow diagram of an example process for generating and communicating a packet in which channel training bits and physical layer header (SIG) bits have been combined, according to an embodiment of the disclosure.

FIG. 6 depicts a flow diagram of an example process 600 for generating and communicating a packet in which channel training bits and physical layer header (SIG) bits have been combined, according to an embodiment of the disclosure. The example process may be implemented by the user device 110 in FIG. 1, in one embodiment. The example process 600 may begin at block 602, where a frame having one or more packets with combined channel training bits and physical layer header (SIG) bits in one symbol duration may be generated (e.g., by the encoding module 132). Processes associated with such generation will be described in greater detail below in association with FIG. 7.

A portion of the frame may be sent via a broadcast communication at block 604. In one embodiment, such a portion of the frame may be the HE-SIG$_1$ 208 field in FIG. 2A, or common information that may be shared between multiple devices receiving the broadcast communication. To facilitate sending the frame, channel training for the broadcast channel used for distributing the frame may be performed at block 606. As described above, such training may include sending an STF (e.g., the L-STF 202 in legacy mode or the HE-STF 252 in green field mode) and an LTF (e.g., the L-LTF in legacy mode or the HE-LTF 254 in green field mode).

At block 608, the user device may beamform in a direction of a receiver device. The beamforming may include sending an STF (e.g., the HE-STF 210a or 210b) that may cause the receiver device to adjust its AGC to facilitate receiving a beamformed transmission. A second portion of the frame may be sent to the receiver device via beamforming using one symbol duration at block 610. The second portion of the frame may be the combined channel training and physical layer header (SIG) bits portion (e.g., the HE-LTF/SIG$_2$ 212a-e fields).

Figure 7:
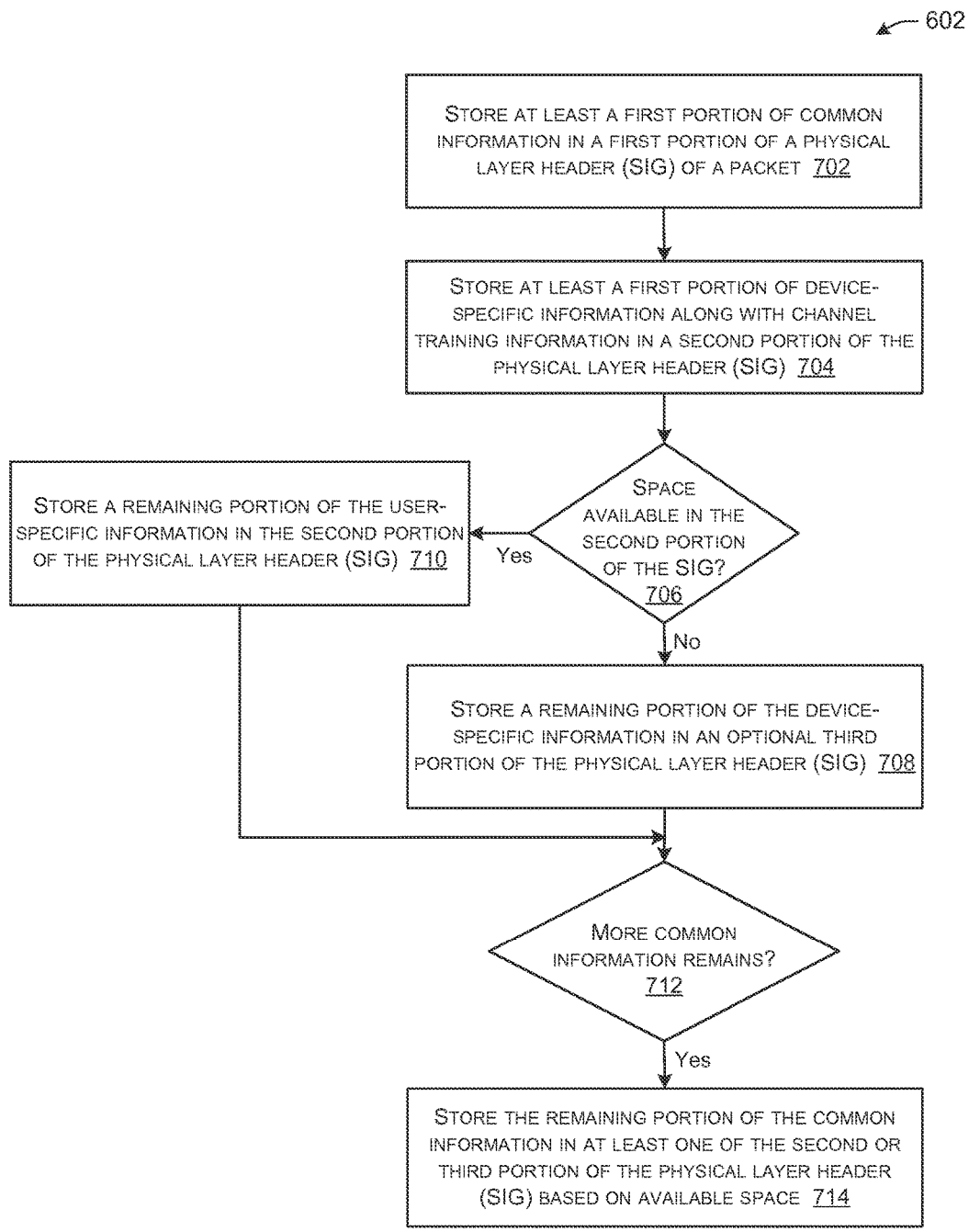
FIG. 7 illustrates a flow diagram of an example process for combining channel training bits and physical layer header (SIG) bits, according to an embodiment of the disclosure.

FIG. 7 depicts a flow diagram of an example process 602 for combining channel training bits and physical layer header (SIG) bits, according to an embodiment of the disclosure. In one embodiment, such bits may be stored in the packet 200 in FIG. 2A. At block 702, at least a portion of common information may be stored in a first portion of a physical layer header (SIG) (e.g., the HE-SIG$_1$ 208 field).

At least a portion of user or device-specific information may be stored along with channel training bits in a second portion of the physical layer header (SIG) (e.g., the HE-LTF/SIG$_2$ 212a-e fields) at block 704. The HE-SIG may include information about each scheduled device such as, but not limited to, a user identification of 7-14 bits, an allocated bandwidth of 204 bits, a location of the bandwidth, or an MCS of 4 bits, as well as other information described above. In some examples, the HE-SIG may be more than 100 bits long. Each addressed device or station in the HE-SIG may search for information associated with it, which may be about 12-20 bits, in some example implementations.

If space is available in the second portion of the physical layer header (SIG) at block 706, then the remaining portion of the device-specific information may be stored in the second portion of the physical layer header (SIG) at block 710. If space is not available in the second portion of the physical layer header (SIG), then the remaining portion of the device-specific information may be stored in an optional third portion of the physical layer header (SIG) (e.g., the optional HE-SIG$_3$ 214a or 214b fields). In some examples, the optional third portion of the physical layer header (SIG) may not be used.

At block 712, if more common information remains, then the remaining portion of the common information may be stored in at least one of the second portion or the third portion of the physical layer header (SIG) based on available space, at block 714. In this way, at least a portion of the common information may be transmitted to a receiver device using beamforming instead of broadcasting, which may increase the reliability of the transmission.

Certain aspects of the disclosure may be described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

According to example embodiments of the disclosure, there may be a device. The device may include at least one memory that stores computer-executable instructions, and at least one processor configured to access the at least one memory. The at least one processor may be configured to execute the computer-executable instructions to receive a first portion of a physical layer header (SIG), the first portion including common information that enables decoding a signal including channel training subcarriers interleaved with data subcarriers in one symbol duration. The decoding may include the at least one processor being further configured to execute the computer-executable instructions to determine, based at least in part on the common information, a portion of subsequent data in a second portion of the physical layer header (SIG) designated for the device.

The common information may include at least one of (i) an indication of a type of packet carrying the channel training subcarriers interleaved with the data subcarriers, (ii) a partition combination of a frequency band used to receive the signal, (iii) a number of respective spatial streams associated with the partition combination, (iv) a group identification of devices scheduled to receive the signal, or (v) a time at which a beamformed transmission of the signal will be received by the device.

The at least one processor may be further configured to execute the computer-executable instructions to receive a short training field (STF) associated with a broadcast message, establish an automatic gain control (AGC) of the device based at least in part on the STF, and receive the broadcast message, the broadcast message including the common information. The symbol duration may be approximately 16.0 microseconds (μs), and wherein the device may include an 802.11ax WiFi device.

The at least one processor may be further configured to execute the computer-executable instructions to receive the second portion of the physical layer header (SIG) over the one symbol duration, the second portion including the signal that includes the channel training subcarriers interleaved with the data subcarriers, estimate an initial channel response of the signal based at least in part on at least one training symbol associated with the channel training subcarriers, determine at least one data symbol associated with the data subcarriers using the at least one training symbol, and update the estimate of the initial channel response based at least in part on the at least one data symbol, wherein the updating includes computer-executable instructions that further configure the at least one processor to determine a full channel response of the signal. At least a portion of the data subcarriers may be adjacent to the channel training sub carriers.

The at least one processor may be further configured to execute the computer-executable instructions to beamform in a direction of a sending device, wherein the signal is received from the sending device via beamforming. The data subcarriers may include physical layer header (SIG) bits, and wherein the at least one processor may be further configured to execute the computer-executable instructions to determine at least a portion of the subsequent data in the signal designated for the device based at least in part on analysis of the physical layer header (SIG) bits, wherein determining the full channel response may include the at least one processor being further configured by the computer-executable instructions to decode the subsequent data. Determining the at least one data symbol may include computer-executable instructions that further configure the at least one processor to determine a channel response for the data subcarriers based at least in part on interpolation, and detect the at least one data symbol using the interpolated channel response. The signal may be received via Multi-User Multiple-Input Multiple-Output (MU-MIMO) mode.

In example embodiments of the disclosure, there may be a system. The system may include at least one radio, at least one antenna, at least one memory that stores computer-executable instructions, and at least one processor configured to access the at least one memory. The at least one processor may be configured to execute the computer-executable instructions to generate a frame including one or more packets. The generation may include computer-executable instructions that configure the at least one processor to store common information in a first portion of a physical layer header (SIG) of the one or more packets, the first portion including common information associated with a signal including channel training subcarriers interleaved with data subcarriers in one symbol duration. The generation may include computer-executable instructions that configure the at least one processor to send a short training field to a receiver device to establish a broadcast channel. The generation may include computer-executable instructions that configure the at least one processor to send a long training field to train the broadcast channel. The generation may include computer-executable instructions that configure the at least one processor to send the first portion of the physical layer header (SIG) to the receiver device over the broadcast channel.

The common information may include at least one of (i) an indication of a type of packet carrying the channel training subcarriers interleaved with the data subcarriers, (ii) a partition combination of a frequency band of the signal, (iii) a number of respective spatial streams associated with the partition combination, (iv) a group identification of one or more devices scheduled to receive the signal, or (v) a time at which a beamformed transmission of the signal will be received by the one or more devices.

The at least one processor may be further configured to execute the computer-executable instructions to store physical layer header (SIG) bits associated with the data subcarriers with channel training bits associated with the channel training subcarriers in one or more spatial streams of a second portion of the physical layer header (SIG), and send the second portion of the physical layer header (SIG) to the receiver device. The one or more computer program modules may further to send a short training field (STF) to the receiver device to establish a beamforming channel with the receiver device, beamform in a direction of the receiver device, and send the second portion of the physical layer header (SIG) to the receiver device via beamforming.

The at least one processor may be further configured to execute the computer-executable instructions to determine that insufficient space exists in the second portion of the physical layer header (SIG) for storing additional physical layer header (SIG) bits, and store, based at least in part on the determination, the additional physical layer header (SIG) bits in a third portion of the physical layer header (SIG). The at least one processor may be further configured to execute the computer-executable instructions to determine that insufficient space exists in the first portion of the physical layer header (SIG) for storing additional common information, and store, based at least in part on the determination, the additional common information in at least one of the second portion of the physical layer header (SIG) or a third portion of the physical layer header (SIG). The system may include an 802.11ax WiFi compliant device, and the receiver device may include an 802.11ax compliant WiFi device or one of an 802.11a, 802.11ac, or 802.11n compliant device. The second portion of the physical layer header (SIG) may be sent to the receiver device via Multi-User Multiple-Input Multiple-Output (MU-MIMO) mode.

In example embodiments of the disclosure, there may be a method. The method may include receiving, by a wireless device including at least one processor, a first portion of a physical layer header (SIG), the first portion including common information that enables decoding a signal including channel training subcarriers interleaved with data subcarriers in one symbol duration. The decoding may include determining, based at least in part on the common information, a portion of subsequent data in a second portion of the physical layer header (SIG) designated for the device.

The common information may include at least one of (i) an indication of a type of packet carrying the channel training subcarriers interleaved with the data subcarriers, (ii) a partition combination of a frequency band used to receive the signal, (iii) a number of respective spatial streams associated with the partition combination, (iv) a group identification of devices scheduled to receive the signal, or (v) a time at which a beamformed transmission of the signal will be received by the device.

The method may further include receiving, by the wireless device, a short training field (STF) associated with a broadcast message, establishing, by the wireless device, an automatic gain control (AGC) of the device based at least in part on the STF, and receiving, by the wireless device, the broadcast message, the broadcast message including the common information. The symbol duration may be approximately 16.0 microseconds (µs), and wherein the device includes an 802.11ax WiFi device. The method may further include receiving, by the wireless device, the second portion of the physical layer header (SIG) over the one symbol duration, the second portion including the signal that includes the channel training subcarriers interleaved with the data subcarriers, estimating, by the wireless device, an initial channel response of the signal based at least in part on at least one training symbol associated with the channel training subcarriers, determining, by the wireless device, at least one data symbol associated with the data subcarriers using the at least one training symbol, and updating, by the wireless device, the estimate of the initial channel response based at least in part on the at least one data symbol, wherein the updating further includes determining a full channel response of the signal. At least a portion of the data subcarriers may be adjacent to the channel training subcarriers.

The method may further include beamforming, by the wireless device, in a direction of a sending device, wherein the signal is received from the sending device via beamforming. The data subcarriers may include physical layer header (SIG) bits, and wherein the method may further include determining, by the wireless device, at least a portion of the subsequent data in the signal designated for the device based at least in part on analysis of the physical layer header (SIG) bits, wherein determining the full channel response may include decoding the subsequent data. Determining the at least one data symbol may include determining a channel response for the data subcarriers based at least in part on interpolation, and detecting the at least one data symbol using the interpolated channel response. The signal may include a plurality of spatial streams received via Multi-User Multiple-Input Multiple-Output (MU-MIMO) mode.

In example embodiments of the disclosure, there may be one or more computer-readable media storing computer-executable instructions that, when executed by at least one processor, configure the at least one processor to perform operations. The operations may include generating a frame including one or more packets. The generation may include computer-executable instructions that configure the at least one processor to store common information in a first portion of a physical layer header (SIG) of the one or more packets, the first portion including common information associated with a signal including channel training subcarriers interleaved with data subcarriers in one symbol duration. The generation may include computer-executable instructions that configure the at least one processor to sending a short training field to a receiver device to establish a broadcast channel. The generation may include computer-executable instructions that configure the at least one processor to sending a long training field to train the broadcast channel. The generation may include computer-executable instructions that configure the at least one processor to sending the first portion of the physical layer header (SIG) to the receiver device over the broadcast channel.

The at least one processor may be further configured to execute the computer-executable instructions to perform the operations including storing physical layer header (SIG) bits associated with the data subcarriers with channel training bits associated with the channel training subcarriers in one or more spatial streams of a second portion of the physical layer header (SIG), and sending the second portion of the physical layer header (SIG) to the receiver device. The one or more computer program modules may be further to sending a short training field (STF) to the receiver device to establish a beamforming channel with the receiver device, beamforming a direction of the receiver device, and sending the second portion of the physical layer header (SIG) to the receiver device via beamforming.

The at least one processor may be further configured to execute the computer-executable instructions to perform the operations including determining that insufficient space exists in the second portion of the physical layer header (SIG) for storing additional physical layer header (SIG) bits, and storing, based at least in part on the determination, the additional physical layer header (SIG) bits in a third portion of the physical layer header (SIG). The at least one processor may be further configured to execute the computer-executable instructions to perform the operations including determining that insufficient space exists in the first portion of the physical layer header (SIG) for storing additional common information, and storing, based at least in part on the determination, the additional common information in at least one of the second portion of the physical layer header (SIG) or a third portion of the physical layer header (SIG). The signal may include a plurality of spatial streams received via Multi-User Multiple-Input Multiple-Output (MU-MIMO) mode.

In example embodiments of the disclosure, there may be one or more computer-readable media storing computer-executable instructions that, when executed by at least one processor, configure the at least one processor to perform operations. The operations may include receiving a first portion of a physical layer header (SIG), the first portion including common information that enables decoding a signal including channel training subcarriers interleaved with data subcarriers in one symbol duration. The decoding may include the at least one processor being further configured to execute the computer-executable instructions to determine, based at least in part on the common information, a portion of subsequent data in a second portion of the physical layer header designated (SIG) for the device.

The common information may include at least one of (i) an indication of a type of packet carrying the channel training subcarriers interleaved with the data subcarriers, (ii) a partition combination of a frequency band used to receive the signal, (iii) a number of respective spatial streams associated with the partition combination, (iv) a group identification of devices scheduled to receive the signal, or (v) a time at which a beamformed transmission of the signal will be received by the device.

The at least one processor may be further configured to execute the computer-executable instructions to perform the operations including receiving a short training field (STF) associated with a broadcast message, establishing an automatic gain control (AGC) of the device based at least in part on the STF, and receiving the broadcast message, the broadcast message including the common information. The symbol duration may be approximately 16.0 microseconds (µs), and wherein the device includes an 802.11ax WiFi device. The at least one processor may be further configured to execute the computer-executable instructions to perform the operations including receiving the second portion of the physical layer header (SIG) over the one symbol duration, the second portion including the signal that includes the channel training subcarriers interleaved with the data subcarriers, estimating an initial channel response of the signal based at least in part on at least one training symbol associated with the channel training subcarriers, determining at least one data symbol associated with the data subcarriers using the at least one training symbol, and updating the estimate of the initial channel response based at least in part on the at least one data symbol, wherein the updating includes computer-executable instructions that further configure the at least one processor to determine a full channel response of the signal. At least a portion of the data subcarriers may be adjacent to the channel training sub carriers.

The at least one processor may be further configured to execute the computer-executable instructions to perform the operations including beamforming in a direction of a sending device, wherein the signal is received from the sending device via beamforming. The data subcarriers may include physical layer header (SIG) bits, and wherein the at least one processor may be further configured to execute the computer-executable instructions to perform the operations including determining at least a portion of the subsequent data in the signal designated for the device based at least in part on analysis of the physical layer header (SIG) bits, wherein determining the full channel response includes the at least one processor being further configured by the computer-executable instructions to decode the subsequent data. Determining the at least one data symbol may include the at least one processor may be further configured to execute the computer-executable instructions to perform the operations including determining a channel response for the data subcarriers based at least in part on interpolation, and detecting the at least one data symbol using the interpolated channel response.

In example embodiments of the disclosure, there may be a method. The method may include generating, by a wireless device including at least one processor, a frame including one or more packets. The method may include storing, by a wireless device, common information in a first portion of a physical layer header (SIG) of the one or more packets, the first portion including common information associated with a signal including channel training subcarriers interleaved with data subcarriers in one symbol duration. The method may include sending, by a wireless device, a short training field to a receiver device to establish a broadcast channel. The method may include sending, by a wireless device, a long training field to train the broadcast channel. The method may include sending, by a wireless device, the first portion of the physical layer header (SIG) to the receiver device over the broadcast channel.

The common information may include at least one of (i) an indication of a type of packet carrying the channel training subcarriers interleaved with the data subcarriers, (ii) a partition combination of a frequency band of the signal, (iii) a number of respective spatial streams associated with the partition combination, (iv) a group identification of one or more devices scheduled to receive the signal, or (v) a time at which a beamformed transmission of the signal will be received by the one or more devices.

The method may further include storing, by a wireless device, physical layer header (SIG) bits associated with the data subcarriers with channel training bits associated with the channel training subcarriers in one or more spatial streams of a second portion of the physical layer header (SIG), and send the second portion of the physical layer header (SIG) to the receiver device. The method may further include sending, by a wireless device, a short training field (STF) to the receiver device to establish a beamforming channel with the receiver device, beamforming, by a wireless device, in a direction of the receiver device, and sending, by a wireless device, the second portion of the physical layer header (SIG) to the receiver device via beamforming.

The method may further include determining, by a wireless device, that insufficient space exists in the second portion of the physical layer header (SIG) for storing additional physical layer header (SIG) bits, and storing, by a wireless device, based at least in part on the determination, the additional physical layer header (SIG) bits in a third portion of the physical layer header (SIG). The method may further include determining, by a wireless device, that insufficient space exists in the first portion of the physical layer header (SIG) for storing additional common information, and storing, by a wireless device, based at least in part on the determination, the additional common information in at least one of the second portion of the physical layer header (SIG) or a third portion of the physical layer header (SIG). The wireless device may include an 802.11ax WiFi compliant device, and the receiver device may include an 802.11ax compliant WiFi device or one of an 802.11a, 802.11ac, or 802.11n compliant device. The second portion of the physical layer header (SIG) may be sent to the receiver device via Multi-User Multiple-Input Multiple-Output (MU-MIMO) mode.

In example embodiments of the disclosure, there may be a device. The device may include at least one memory that stores computer-executable instructions, and at least one processor configured to access the at least one memory. The at least one processor may be configured to execute the computer-executable instructions to generate a frame including one or more packets. The generation may include computer-executable instructions that configure the at least one processor to store common information in a first portion of a physical layer header (SIG) of the one or more packets, the first portion including common information associated with a signal including channel training subcarriers interleaved with data subcarriers in one symbol duration. The generation may include computer-executable instructions that configure the at least one processor to send a short training field to a receiver device to establish a broadcast channel. The generation may include computer-executable instructions that configure the at least one processor to send a long training field to train the broadcast channel. The generation may include computer-executable instructions that configure the at least one processor to send the first portion of the physical layer header (SIG) to the receiver device over the broadcast channel.

The common information may include at least one of (i) an indication of a type of packet carrying the channel training subcarriers interleaved with the data subcarriers, (ii) a partition combination of a frequency band of the signal, (iii) a number of respective spatial streams associated with the partition combination, (iv) a group identification of one or more devices scheduled to receive the signal, or (v) a time at which a beamformed transmission of the signal will be received by the one or more devices.

The at least one processor may be further configured to execute the computer-executable instructions to store physical layer header (SIG) bits associated with the data subcarriers with channel training bits associated with the channel training subcarriers in one or more spatial streams of a second portion of the physical layer header (SIG), and send the second portion of the physical layer header (SIG) to the receiver device. The one or more computer program modules may further to send a short training field (STF) to the receiver device to establish a beamforming channel with the receiver device, beamform in a direction of the receiver device, and send the second portion of the physical layer header (SIG) to the receiver device via beamforming.

The at least one processor may be further configured to execute the computer-executable instructions to determine that insufficient space exists in the second portion of the physical layer header (SIG) for storing additional physical layer header (SIG) bits, and store, based at least in part on the determination, the additional physical layer header (SIG) bits in a third portion of the physical layer header (SIG). The at least one processor may be further configured to execute the computer-executable instructions to determine that insufficient space exists in the first portion of the physical layer header (SIG) for storing additional common information, and store, based at least in part on the determination, the additional common information in at least one of the second portion of the physical layer header (SIG) or a third portion of the physical layer header (SIG). The device may include an 802.11ax WiFi compliant device, and the receiver device may include an 802.11ax compliant WiFi device or one of an 802.11a, 802.11ac, or 802.11n compliant device. The second portion of the physical layer header (SIG) may be sent to the receiver device via Multi-User Multiple-Input Multiple-Output (MU-MIMO) mode.

In further example embodiments of the disclosure, there may be an apparatus. The apparatus may include at least one radio and at least one antenna. The apparatus may further include means for receiving a first portion of a physical layer header (SIG), the first portion comprising common information that enables decoding a signal including channel training subcarriers interleaved with data subcarriers in one symbol duration. The decoding may include means for determining, based at least in part on the common information, a portion of subsequent data in a second portion of the physical layer header (SIG) designated for the device.

The common information may include at least one of (i) an indication of a type of packet carrying the channel training subcarriers interleaved with the data subcarriers, (ii) a partition combination of a frequency band used to receive the signal, (iii) a number of respective spatial streams associated with the partition combination, (iv) a group identification of devices scheduled to receive the signal, or (v) a time at which a beamformed transmission of the signal will be received by the device.

The apparatus may further include means for receiving a short training field (STF) associated with a broadcast message, means for establishing an automatic gain control (AGC) of the device based at least in part on the STF, and means for receiving the broadcast message. The broadcast message may include the common information. The symbol duration may be approximately 16.0 microseconds (μs), and wherein the device comprises an 802.11ax WiFi device.

The apparatus may further include means for receiving the second portion of the physical layer header (SIG) over the one symbol duration. The second portion may include the signal that includes the channel training subcarriers interleaved with the data subcarriers. The apparatus may further include means for estimating an initial channel response of the signal based at least in part on at least one training symbol associated with the channel training subcarriers, means for determining at least one data symbol associated with the data subcarriers using the at least one training symbol, and means for updating the estimate of the initial channel response based at least in part on the at least one data symbol. The updating may include means for determining a full channel response of the signal. At least a portion of the data subcarriers is adjacent to the channel training subcarriers.

The apparatus may further include means for beamforming in a direction of a sending device, wherein the signal is received from the sending device via beamforming. The data subcarriers may include physical layer header (SIG) bits. The apparatus may further include means for determining at least a portion of the subsequent data in the signal designated for the device based at least in part on analysis of the physical layer header (SIG) bits. Determining the full channel response may include means for decoding the subsequent data. The means for determining the at least one data symbol may further include means for determining a channel response for the data subcarriers based at least in part on interpolation and means for detecting the at least one data symbol using the interpolated channel response. The signal may include a plurality of spatial streams received via Multi-User Multiple-Input Multiple-Output (MU-MIMO) mode.

What is claimed is:

1. A device comprising:
   at least one memory that stores computer-executable instructions; and
   at least one processor configured to access the at least one memory, wherein the at least one processor is configured to execute the computer-executable instructions to:
   receive a first portion of a signal field in a physical layer header, the first portion comprising common information that enables decoding a signal including channel training subcarriers associated with a long training field, wherein the channel training subcarriers are interleaved with signal subcarriers in one symbol duration, wherein the channel training subcarriers are repeated at a first predetermined interval;
   wherein the decoding comprises the at least one processor being further configured to execute the computer-executable instructions to determine, based at least in part on the common information, a second portion of the signal field of the physical layer header designated for the device, wherein the second portion comprises one or more signal bits combined with one or more long training field bits.

2. The device of claim 1, wherein the common information comprises at least one of (i) an indication of a type of packet carrying the channel training subcarriers interleaved with the data subcarriers, (ii) a partition combination of a frequency band used to receive the signal, (iii) a number of respective spatial streams associated with the partition combination, (iv) a group identification of devices scheduled to receive the signal, or (v) a time at which a beamformed transmission of the signal will be received by the device.

3. The device of claim 1, wherein the at least one processor is further configured to execute the computer-executable instructions to:
   receive a short training field (STF) associated with a broadcast message;
   establish an automatic gain control (AGC) of the device based at least in part on the STF; and
   receive the broadcast message, the broadcast message comprising the common information.

4. The device of claim 1, wherein the symbol duration is approximately 16.0 microseconds (μs), and wherein the device comprises an 802.11ax WiFi device.

5. The device of claim 1, wherein the at least one processor is further configured to execute the computer-executable instructions to:
   receive the second portion of the signal field of the physical layer header over the one symbol duration, the second portion comprising the signal that includes the channel training subcarriers interleaved with the data subcarriers;
   estimate an initial channel response of the signal based at least in part on at least one training symbol associated with the channel training subcarriers;
   determine at least one data symbol associated with the data subcarriers using the at least one training symbol; and
   update the estimate of the initial channel response based at least in part on the at least one data symbol, wherein the updating comprises computer-executable instructions that further configure the at least one processor to determine a full channel response of the signal.

6. The device of claim 5, wherein at least a portion of the data subcarriers is adjacent to the channel training subcarriers.

7. The device of claim 5, wherein the at least one processor is further configured to execute the computer-executable instructions to:

beamform in a direction of a sending device, wherein the signal is received from the sending device via beamforming.

8. The device of claim 5, wherein the data subcarriers comprise physical layer header bits, and wherein the at least one processor is further configured to execute the computer-executable instructions to:
determine at least a portion of the subsequent data in the signal designated for the device based at least in part on analysis of the physical layer header bits;
wherein determining the full channel response comprises the at least one processor being further configured by the computer-executable instructions to decode the subsequent data.

9. The device of claim 5, wherein determining the at least one data symbol comprises computer-executable instructions that further configure the at least one processor to:
determine a channel response for the data subcarriers based at least in part on interpolation; and
detect the at least one data symbol using the interpolated channel response.

10. The device of claim 1, wherein the signal comprises a plurality of spatial streams received via Multi-User Multiple-Input Multiple-Output (MU-MIMO) mode.

11. A system comprising:
at least one radio;
at least one antenna;
at least one memory that stores computer-executable instructions; and
at least one processor configured to access the at least one memory, wherein the at least one processor is configured to execute the computer-executable instructions to:
generate a frame comprising one or more packets, wherein the generation comprises computer-executable instructions that configure the at least one processor to:
store common information in a first portion of a signal field of a physical layer header of the one or more packets, the first portion comprising common information associated with a signal including channel training subcarriers associated with a long training field, wherein the channel training subcarriers are interleaved with signal subcarriers in one symbol duration, wherein the channel training subcarriers are repeated at a first predetermined interval;
determine a second portion of the signal field, wherein the second portion comprises one or more bits combined with one or more long training field bits;
send a short training field to a receiver device to establish a broadcast channel; and
send the first portion and the second portion of the signal field of the physical layer header to the receiver device over the broadcast channel.

12. The system of claim 11, wherein the common information comprises at least one of (i) an indication of a type of packet carrying the channel training subcarriers interleaved with the data subcarriers, (ii) a partition combination of a frequency band of the signal, (iii) a number of respective spatial streams associated with the partition combination, (iv) a group identification of one or more devices scheduled to receive the signal, or (v) a time at which a beamformed transmission of the signal will be received by the one or more devices.

13. The system of claim 11, wherein the at least one processor is further configured to execute the computer-executable instructions to:
store physical layer header bits associated with the data subcarriers with channel training bits associated with the channel training subcarriers in one or more spatial streams of a second portion of the physical layer header; and
send the second portion of the physical layer header to the receiver device.

14. The system of claim 13, the one or more computer program modules further to:
send a short training field (STF) to the receiver device to establish a beamforming channel with the receiver device;
beamform in a direction of the receiver device; and
send the second portion of the physical layer header to the receiver device via beamforming.

15. The system of claim 13, wherein the at least one processor is further configured to execute the computer-executable instructions to:
determine that insufficient space exists in the second portion of the physical layer header for storing additional physical layer header bits; and
store, based at least in part on the determination, the additional physical layer header bits in a third portion of the physical layer header.

16. The system of claim 13, wherein the at least one processor is further configured to execute the computer-executable instructions to:
determine that insufficient space exists in the first portion of the physical layer header for storing additional common information; and
store, based at least in part on the determination, the additional common information in at least one of the second portion of the physical layer header or a third portion of the physical layer header.

17. The system of claim 13, wherein the system comprises an 802.11ax WiFi compliant device, and the receiver device comprises an 802.11ax compliant WiFi device or one of an 802.11a, 802.11ac, or 802.11n compliant device.

18. The system of claim 13, wherein the second portion of the physical layer header is sent to the receiver device via Multi-User Multiple-Input Multiple-Output (MU-MIMO) mode.

19. A method comprising:
receiving, by a wireless device comprising at least one processor, a first portion of a signal field of a physical layer header, the first portion comprising common information that enables decoding a signal including channel training subcarriers associated with a long training field, wherein the channel training subcarriers are interleaved with signal subcarriers in one symbol duration, wherein the channel training subcarriers are repeated at a first predetermined interval;
wherein the decoding comprises determining, based at least in part on the common information, a portion of subsequent data in a second portion of the signal field of the physical layer header designated for the wireless device, wherein the second portion comprises one or more bits combined with one or more long training field bits.

20. The method of claim 19, wherein the common information comprises at least one of (i) an indication of a type of packet carrying the channel training subcarriers interleaved with the data subcarriers, (ii) a partition combination of a frequency band used to receive the signal, (iii) a number of respective spatial streams associated with the partition combination, (iv) a group identification of devices scheduled to receive the signal, or (v) a time at which a beamformed transmission of the signal will be received by the device.

21. The method of claim 19, further comprising:
receiving, by the wireless device, a short training field (STF) associated with a broadcast message;
establishing, by the wireless device, an automatic gain control (AGC) of the device based at least in part on the STF; and
receiving, by the wireless device, the broadcast message, the broadcast message comprising the common information.

22. The method of claim 19, wherein the symbol duration is approximately 16.0 microseconds (µs), and wherein the device comprises an 802.11ax WiFi device.

23. The method of claim 19, further comprising:
receiving, by the wireless device, the second portion of the physical layer header over the one symbol duration, the second portion comprising the signal that includes the channel training subcarriers interleaved with the data subcarriers;
estimating, by the wireless device, an initial channel response of the signal based at least in part on at least one training symbol associated with the channel training subcarriers;
determining, by the wireless device, at least one data symbol associated with the data subcarriers using the at least one training symbol; and
updating, by the wireless device, the estimate of the initial channel response based at least in part on the at least one data symbol, wherein the updating further comprises determining a full channel response of the signal.

24. The method of claim 23, wherein at least a portion of the data subcarriers is adjacent to the channel training subcarriers.

25. The method of claim 23, further comprising:
beamforming, by the wireless device, in a direction of a sending device, wherein the signal is received from the sending device via beamforming.

26. The method of claim 23, wherein the data subcarriers comprise physical layer header bits, and wherein the method further comprises:
determining, by the wireless device, at least a portion of the subsequent data in the signal designated for the device based at least in part on analysis of the physical layer header bits;
wherein determining the full channel response comprises decoding the subsequent data.

27. The method of claim 23, wherein determining the at least one data symbol comprises:
determining a channel response for the data subcarriers based at least in part on interpolation; and
detecting the at least one data symbol using the interpolated channel response.

28. The method of claim 23, wherein the signal comprises a plurality of spatial streams received via Multi-User Multiple-Input Multiple-Output (MU-MIMO) mode.

29. One or more computer-readable media storing computer-executable instructions that, when executed by at least one processor, configure the at least one processor to perform operations comprising:
generating a frame comprising one or more packets, wherein the generation comprises computer-executable instructions that configure the at least one processor to:
storing common information in a first portion of a signal field of a physical layer header of the one or more packets, the first portion comprising common information associated with a signal including channel training subcarriers associated with a long training field, wherein the channel training subcarriers are interleaved with signal subcarriers in one symbol duration, wherein the channel training subcarriers are repeated at a first predetermined interval;
determine a second portion of the signal field, wherein the second portion comprises one or more bits combined with one or more long training field bits;
sending a short training field to a receiver device to establish a broadcast channel; and
sending the first portion and the second portion of the signal field of the physical layer header to the receiver device over the broadcast channel.

30. The one or more computer-readable media of claim 29, wherein the at least one processor is further configured to execute the computer-executable instructions to perform the operations comprising:
storing physical layer header bits associated with the data subcarriers with channel training bits associated with the channel training subcarriers in one or more spatial streams of a second portion of the physical layer header; and
sending the second portion of the physical layer header to the receiver device.

31. The one or more computer-readable media of claim 29, the one or more computer program modules further to:
sending a short training field (STF) to the receiver device to establish a beamforming channel with the receiver device;
beamforming a direction of the receiver device; and
sending the second portion of the physical layer header to the receiver device via beamforming.

32. The one or more computer-readable media of claim 31, wherein the at least one processor is further configured to execute the computer-executable instructions to perform the operations comprising:
determining that insufficient space exists in the second portion of the physical layer header for storing additional physical layer header bits; and
storing, based at least in part on the determination, the additional physical layer header bits in a third portion of the physical layer header.

33. The one or more computer-readable media of claim 31, wherein the second portion of the physical layer header is sent to the receiver device via Multi-User Multiple-Input Multiple-Output (MU-MIMO) mode.

* * * * *